(12) United States Patent
Yamawaki et al.

(10) Patent No.: US 11,111,956 B2
(45) Date of Patent: Sep. 7, 2021

(54) SQUEEZE FILM DAMPER BEARING AND ROTARY MACHINE INCLUDING THE SAME

(71) Applicant: MITSUBISHI HEAVY INDUSTRIES, LTD., Tokyo (JP)

(72) Inventors: Teruaki Yamawaki, Tokyo (JP); Yasunori Tokimasa, Tokyo (JP); Takeshi Sano, Tokyo (JP); Kodai Iwatsu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/787,228

(22) Filed: Feb. 11, 2020

(65) Prior Publication Data

US 2020/0271159 A1   Aug. 27, 2020

(30) Foreign Application Priority Data

Feb. 27, 2019  (JP) .............................. JP2019-034787
Feb. 27, 2019  (JP) .............................. JP2019-034788

(51) Int. Cl.
| | |
|---|---|
| *F16C 27/02* | (2006.01) |
| *F16C 27/04* | (2006.01) |
| *F16C 17/03* | (2006.01) |
| *F16C 33/10* | (2006.01) |
| *F16F 15/02* | (2006.01) |
| *F16F 15/023* | (2006.01) |
| *F02C 7/06* | (2006.01) |

(52) U.S. Cl.
CPC .............. *F16C 27/045* (2013.01); *F02C 7/06* (2013.01); *F16C 17/03* (2013.01); *F16C 27/02* (2013.01); *F16C 33/1085* (2013.01); *F16F 15/0237* (2013.01); *F05D 2240/50* (2013.01); *F16C 2360/44* (2013.01)

(58) Field of Classification Search
CPC ........ F16C 17/03; F16C 27/02; F16C 27/045; F16C 33/108; F16C 2360/44; F16C 33/1085; F02C 7/06; F16F 15/0237; F01D 25/164; F05D 2240/50
USPC ........................... 384/99, 119, 301, 309, 129
See application file for complete search history.

(56) References Cited

U.S. PATENT DOCUMENTS 5,316,391 A * 5/1994 Monzel ..................... F16F 1/32
                                                        384/99
5,651,616 A * 7/1997 Hustak .................. F01D 25/164
                                                        384/119
(Continued)

FOREIGN PATENT DOCUMENTS

DE       10258528 A1 * 7/2004  ............. F01D 25/16
JP       2000-145768      5/2000
(Continued)

*Primary Examiner* — Marcus Charles
(74) *Attorney, Agent, or Firm* — Wenderoth, Lind & Ponack, L.L.P.

(57) ABSTRACT

A squeeze film damper bearing has an inner support ring capable of supporting a bearing portion; an outer support ring disposed on an outer periphery of the inner support ring; and a dissipation portion formed on at least one of the outer support ring and the inner support ring to dissipate vibration energy. A damper gap formed between an outer circumferential face of the inner support ring and an inner circumferential face of the outer support ring is filled with a viscous fluid.

14 Claims, 16 Drawing Sheets

(56) References Cited

U.S. PATENT DOCUMENTS

| | | | | |
|---|---|---|---|---|
| 5,738,356 A * | 4/1998 | Marshall | ............... | F01D 25/186 |
| | | | | 277/313 |
| 8,894,286 B2 * | 11/2014 | Nicholas | ................ | F16C 17/03 |
| | | | | 384/302 |
| 10,156,159 B1 * | 12/2018 | Ganiger | ................ | F16C 27/045 |
| 2018/0030854 A1 * | 2/2018 | Flouros | ................ | F16C 37/007 |
| 2018/0320553 A1 * | 11/2018 | Payyoor | ................ | F01D 25/164 |
| 2019/0055853 A1 * | 2/2019 | Smedresman | ........ | F01D 25/183 |
| 2019/0186492 A1 * | 6/2019 | Liu | ....................... | F04C 27/008 |

FOREIGN PATENT DOCUMENTS

| | | | | |
|---|---|---|---|---|
| JP | 2012122537 A * | 6/2012 | | |
| JP | 2013204740 A * | 10/2013 | ............ | F16C 27/045 |
| WO | WO-2015083697 A1 * | 6/2015 | .............. | F16C 27/02 |

* cited by examiner

AXIAL DIRECTION

SQUEEZE FILM DAMPER BEARING AND ROTARY MACHINE INCLUDING THE SAME

CROSS-REFERENCE TO RELATED APPLICATIONS

Priority is claimed on Japanese Patent Application No. 2019-34787 and Japanese Patent Application No. 2019-34788, each filed Feb. 27, 2019, the contents of which are incorporated herein by reference.

BACKGROUND OF THE INVENTION

1. Field of the Invention

The present invention relates to a squeeze film damper bearing used for a rotary machine such as a compressor, and a rotary machine including the same.

2. Description of the Related Art

In a rotary machine such as a compressor, a radial bearing that supports a rotary shaft is used. As one of the radial bearings, there is a squeeze film damper bearing having a squeeze film damper. In the squeeze film damper bearing, increased damping can be obtained as compared with a normal bearing, by introducing a viscous fluid into a damper gap between an inner support ring for supporting a bearing portion and an outer support ring disposed around an outer periphery of the inner support ring to form a fluid film and provide a so-called squeeze effect. As such a squeeze film damper bearing, a bearing described in Japanese Unexamined Patent Application, First Publication No. 2000-145768 is known.

In a rotary machine having a gear such as a geared compressor, since a load to be applied to the bearing portion varies greatly depending on the load condition, if the damper gap is narrowed to obtain the required damping, the inner support ring and the outer support ring may come into contact with each other. In order to prevent this contact, it is conceivable to widen the damper gap of the bearing. However, in the squeeze film damper described in Japanese Unexamined Patent Application, First Publication No. 2000-145768, when the damper gap is widened, the pressure generated in the fluid film decreases, and the damping performance decreases at an increasing rate.

The present invention has been made in view of the above circumstances, and an object thereof is to provide a squeeze film damper bearing in which the damping performance is further improved, and a rotary machine including the same.

SUMMARY OF THE INVENTION

According to a first aspect of the present invention, a squeeze film damper bearing includes: an inner support ring capable of supporting a bearing portion; an outer support ring disposed on an outer periphery of the inner support ring; and a dissipation portion formed on at least one of the outer support ring and the inner support ring to dissipate vibration energy, in which a damper gap formed between an outer circumferential face of the inner support ring and an inner circumferential face of the outer support ring is filled with a viscous fluid.

With such a configuration, when the bearing portion and the inner support ring supporting the bearing portion vibrate with the rotation of the rotary shaft, since dissipation of the vibration energy occurs in the dissipation portion, the damping effect can be improved along with obtaining the squeeze effect of a film of the viscous fluid. In addition, even when the damping effect due to the squeeze effect decreases due to widening of the damper gap, it is possible to suppress the reduction in the damping effect and secure the stability of the rotary shaft system, by providing the damping effect due to the dissipation of vibration energy.

According to a second aspect of the present invention, the dissipation portion of squeeze film damper bearing according to the first aspect may include one or more holes formed on at least one of the inner circumferential face of the outer support ring and the outer circumferential face of the inner support ring.

With such a configuration, when the bearing portion and the inner support ring that supports the bearing portion vibrate with the rotation of the rotary shaft, since the viscous fluid moves in the axial direction or the circumferential direction, a vortex is generated in the holes, and viscous dissipation due to the vortex is generated, vibration energy is dissipated. Therefore, since a damping effect is obtained by viscous dissipation in addition to the conventional squeeze effect, the damping effect can be improved. Further, even when the damping effect due to the squeeze effect decreases because the damper gap is widened, by imparting the damping effect due to the viscous dissipation, it is possible to suppress the decrease in the damping effect, and to secure the stability of the rotary shaft system. Further, the damping effect can be adjusted by adjusting the dimensions, shape, number, arrangement, arrangement interval, and the like of the holes.

According to a third aspect of the present invention, the dissipation portion of the squeeze film damper bearing according to the first aspect may include one or more circumferential grooves formed on at least one of the inner circumferential face of the outer support ring and the outer circumferential face of the inner support ring.

With such a configuration, when the bearing portion and the inner support ring that supports the bearing portion vibrate with the rotation of the rotary shaft, the viscous fluid flows into the circumferential groove to generate a vortex. At this time, since viscous dissipation occurs, a damping effect can be obtained. Therefore, since the damping effect is obtained by viscous dissipation in addition to the conventional squeeze effect, the damping effect can be improved. Further, even when the damping effect due to the squeeze effect decreases because the damper gap is widened, by imparting the damping effect due to viscous dissipation, it is possible to suppress the decrease in the damping effect, and to secure the stability of the rotary shaft system. Further, the damping effect can be adjusted by adjusting the dimensions, shape, number, arrangement, arrangement interval, and the like of the circumferential groove.

According to a fourth aspect of the present invention, the dissipation portion of the squeeze film damper bearing according to the first aspect may include one or more first protrusions formed on the inner circumferential face of the outer support ring, and one or more second protrusions formed on the outer circumferential face of the inner support ring, in which the first protrusions and the second protrusions may be alternately disposed in a predetermined direction, and gaps may be formed between adjacent first and second protrusions.

With such a configuration, the first protrusion formed on the inner circumferential face of the outer support ring and the second protrusion formed on the outer circumferential face of the inner support ring are alternately disposed in a predetermined direction, thereby forming gaps, resistance occurs when the viscous fluid flows through the gaps, and since the dissipation of vibration energy increases, the damping effect can be improved.

Further, the damping effect can be adjusted by adjusting the dimensions, shape, number, arrangement, arrangement interval, and the like of the first and second protrusions.

According to a fifth aspect of the present invention, the dissipation portion of the squeeze film damper bearing according to the fourth aspect may include a first protrusion flow path formed in the first protrusion and through which the viscous fluid flows, and a second protrusion flow path formed in the second protrusion and through which the viscous fluid flows.

With such a configuration, when the viscous fluid moves through the damper gap due to the vibration of the inner support ring, the viscous fluid flows around the first protrusion or the second protrusion, and flows through the first protrusion flow path formed in the first protrusion and the second protrusion flow path formed in the second protrusion. At this time, since a resistance occurs when the viscous fluid passes through the first protrusion flow path or the second protrusion flow path, and the dissipation of vibration energy increases, the damping effect can be further improved.

Further, the damping effect can be adjusted by adjusting the dimensions, shape, arrangement, and the like of the first protrusion flow path or the second protrusion flow path.

According to aسسsixth aspect of the present invention, the dissipation portion of the squeeze film damper bearing according to the first aspect may include a plurality of first flow portions formed on the inner circumferential face of the outer support ring and through which the viscous fluid flows, and a first flow path communicating with the first flow portion aligned in a circumferential direction of the outer support ring, in which the viscous fluid flows through the first flow path.

With such a configuration, when the viscous fluid moves in the damper gap with the vibration of the inner support ring, the viscous fluid flows through the first flow path via the first flow portion. At this time, since a resistance occurs when the viscous fluid passes through the first flow path, and the dissipation of vibration energy increases, the damping effect can be improved.

According to a seventh aspect of the present invention, the dissipation portion of the squeeze film damper bearing according to the sixth aspect may further include a plurality of second flow portions formed on the outer circumferential face of the inner support ring and through which the viscous fluid flows, and a second flow path communicating with the second flow portion aligned in the circumferential direction of the inner support ring, in which the viscous fluid flows through the second flow path.

With such a configuration, when the viscous fluid moves in the damper gap with the vibration of the inner support ring, the viscous fluid flows through the second flow path via the second flow portion. At this time, since resistance occurs when the viscous fluid passes through the second flow path, and the dissipation of vibration energy increases, the damping effect can be improved.

According to an eighth aspect of the present invention, a squeeze film damper bearing includes: an inner support ring capable of supporting a bearing portion; an outer support ring disposed on an outer periphery of the inner support ring; and a resistance member installed on an end face of a damper gap formed between an outer circumferential face of the inner support ring and an inner circumferential face of the outer support ring, in which the damper gap is filled with a viscous fluid.

With such a configuration, when the bearing portion and the inner support ring that supports the bearing portion vibrate with the rotation of the rotary shaft, and the viscous fluid is discharged from the damper gap, since the resistance member acts as a resistance against the flow of the viscous fluid, vibration energy is dissipated. Accordingly, since the viscous fluid discharged from the damper gap functions as a damper against the vibration of the inner support ring, the damping effect can be improved along with obtaining the squeeze effect of the film the viscous fluid.

In addition, even if the damping effect due to the squeeze effect decreases due to the widening of the damper gap, by imparting the damping effect due to the dissipation of vibration energy by the resistance member, it is possible to suppress the decrease in the damping effect and secure stability of the rotary shaft system.

According to a ninth aspect of the present invention, the resistance member of the squeeze film damper bearing according to the eighth aspect may be formed in a mesh.

With such a configuration, when the bearing portion and the inner support ring that supports the bearing portion vibrate with the rotation of the rotary shaft, the viscous fluid is discharged from the damper gap, since the resistance member acts as a resistance against the flow of the viscous fluid, vibration energy is dissipated. Accordingly, since the viscous fluid discharged from the damper gap functions as a damper against the vibration of the inner support ring, the damping effect can be improved along with obtaining the squeeze effect of the film of the viscous fluid. Further, the damping effect can be adjusted by adjusting the type, roughness, dimensions, and the like of the mesh.

In addition, even when the damping effect due to the squeeze effect decreases because of widening of the damper gap, by imparting the damping effect due to dissipation of the vibration energy, it is possible to suppress the decrease in the damping effect and secure the stability of the rotary shaft system.

According to a tenth aspect of the present invention, the end face of the damper gap of the squeeze film damper bearing according to the eighth aspect may be partially covered with the resistance member.

With such a configuration, when the bearing portion and the inner support ring supporting the bearing portion vibrate with the rotation of the rotary shaft, the viscous fluid is discharged from the damper gap, and oil is discharged from the damper gap, since the flow in the damper gap can be narrowed with a simple configuration, and the vibration energy is dissipated, the damping effect can be improved.

According to an eleventh aspect of the present invention, the outer support ring of the squeeze film damper bearing according to the eighth aspect may include a groove extending in a direction toward the end face.

With such a configuration, when the bearing portion and the inner support ring that supports the bearing portion vibrate with the rotation of the rotary shaft, and the viscous fluid moves through the damper gap, since the viscous fluid flows into the groove, and flows in the direction in which the groove extends, it is possible to obtain a rectifying effect of promoting the flow of the viscous fluid in the direction toward the end face. Therefore, vibration energy is efficiently dissipated, and the damping effect can be improved.

According to a twelfth aspect of the present invention, the inner support ring of the squeeze film damper bearing according to eighth aspect may include a plurality of partition plates formed on an outer circumferential face.

With such a configuration, when the bearing portion and the inner support ring that supports the bearing portion vibrate with the rotation of the rotary shaft, and the viscous fluid moves through the damper gap, the partition plate can inhibit the movement of the viscous fluid in the circumferential direction, and can promote the flow of the viscous fluid in the direction toward the end face of the damper gap. Therefore, the vibration energy is efficiently dissipated by the resistance member installed on the end face of the damper gap, and the damping effect can be improved.

A rotary machine according to at least one aspect of the present invention includes the squeeze film damper bearing according to any one of the first to twelfth aspects, and a rotary shaft supported by the squeeze film damper bearing in a rotatable manner.

With such a configuration, it is possible to obtain a rotary machine having a damping effect provided by the squeeze film damper bearing according to the first to twelfth aspects.

According to the present invention, it is possible to provide a squeeze film damper bearing in which the damping performance is further improved, and a rotary machine including the same.

DETAILED DESCRIPTION OF THE INVENTION

First Embodiment

Figure 1:
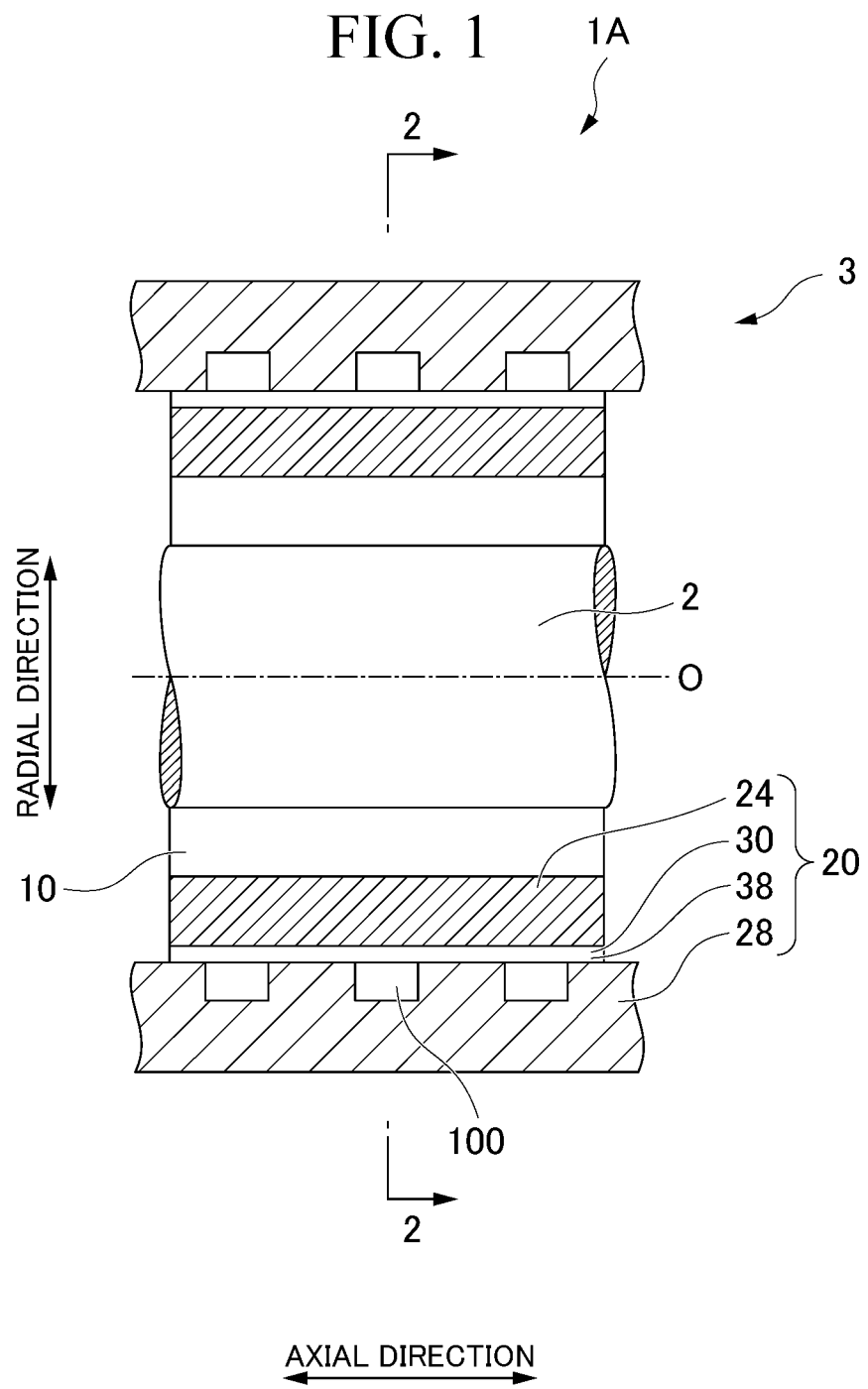
FIG. 1 is a cross-sectional view showing a rotary machine according to a first embodiment of the present invention.
Figure 2:
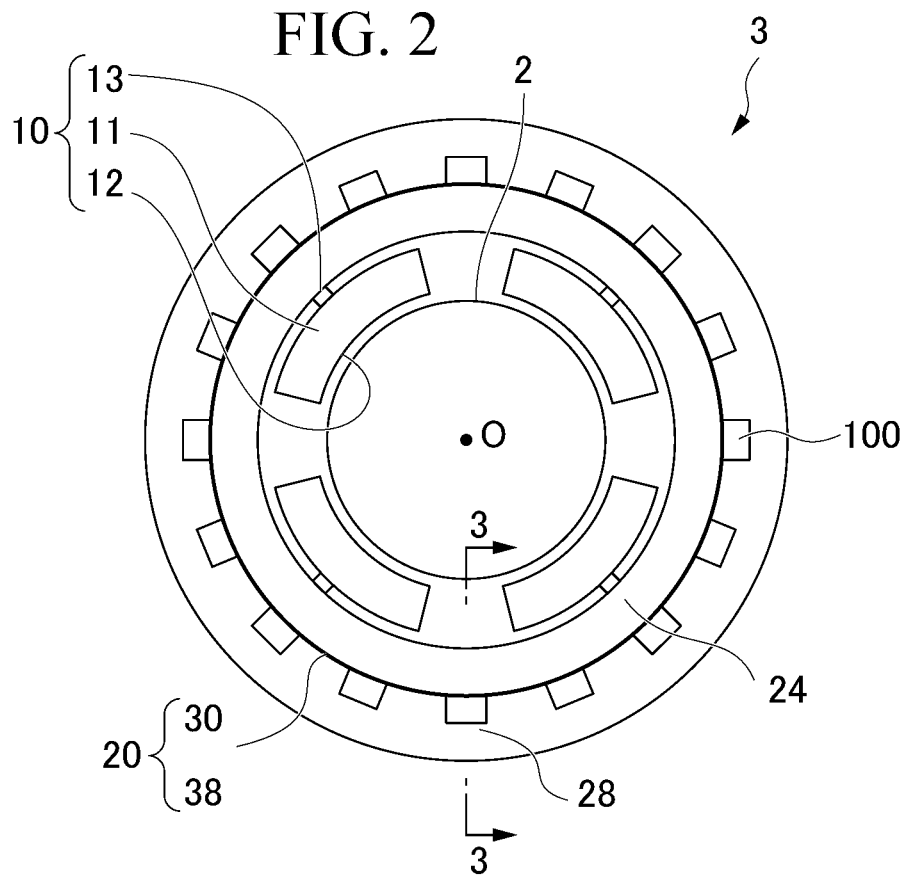
FIG. 2 is an axial cross-sectional view showing the rotary machine according to the first embodiment of the present invention, and is a cross-sectional view taken along a line—2-2—of FIG. 1.
Figure 3:
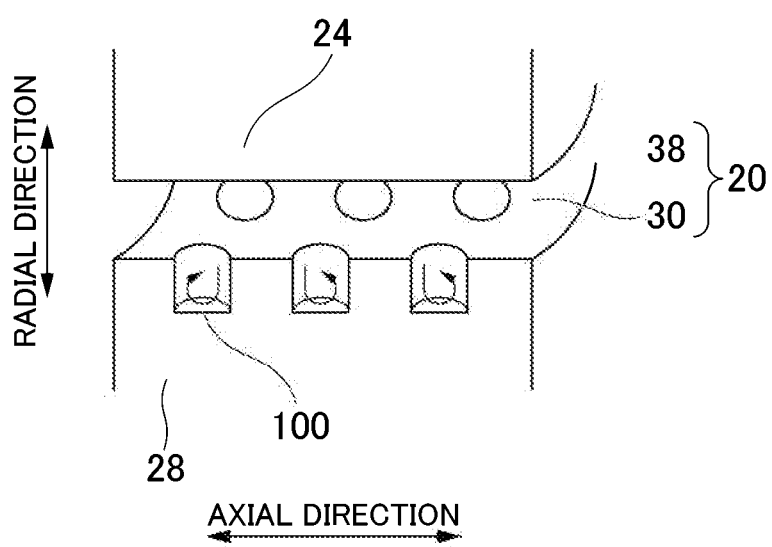
FIG. 3 is a cross-sectional view showing a squeeze film damper bearing according to the first embodiment of the present invention, and is a cross-sectional view taken along a line—3-3—of FIG. 2.
Figure 4:
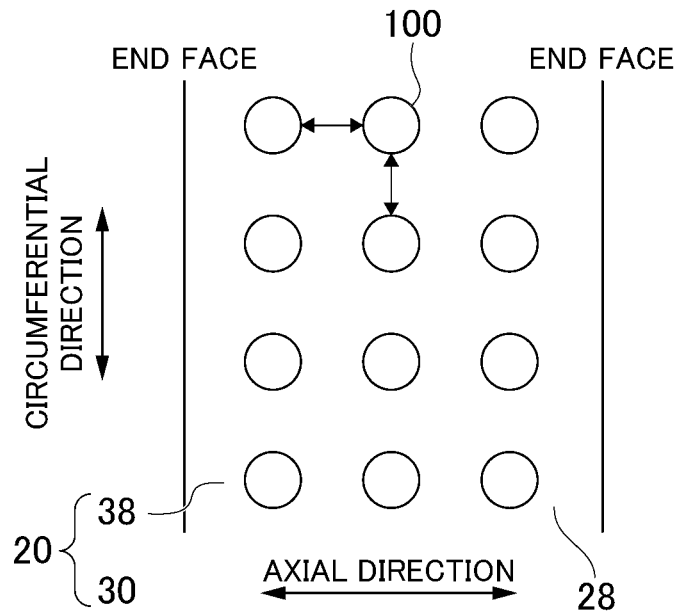
FIG. 4 is a schematic view showing a part of an inner circumferential face of an outer support ring according to the first embodiment of the present invention.
Figure 5:
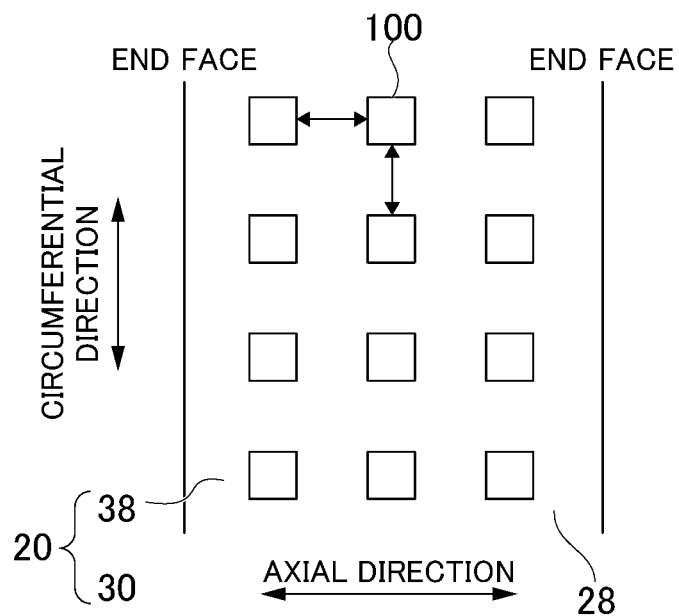
FIG. 5 is a schematic view showing a part of the inner circumferential face of the outer support ring according to a modified example of the first embodiment of the present invention.

The first embodiment of the present invention will be described with reference to FIGS. 1 to 5 and 31. FIG. 1 is a cross-sectional view showing a rotary machine according to the present embodiment. The rotary machine 1A is a compressor that pumps fluid, and is, for example, a geared compressor that supports a rotary shaft connected via gears with a squeeze film damper bearing. As shown in FIG. 1, the rotary machine 1A is equipped with a rotary shaft 2, and a squeeze film damper bearing 3 that supports the rotary shaft 2. The squeeze film damper bearing 3 has a squeeze film damper 20. FIG. 2 is an axial cross-sectional view showing the rotary machine according to the present embodiment, and is a cross-sectional view taken along a line—2-2—of FIG. 1. FIG. 3 is a cross-sectional view showing the squeeze film damper bearing according to the present embodiment, and is a cross-sectional view taken along a line—3-3—of FIG. 2. FIG. 4 is a schematic view showing a part of an inner circumferential face of the outer support ring according to the present embodiment. FIG. 5 is a schematic view showing a part of the inner circumferential face of the outer support ring according to a modified example of the present embodiment.

Figure 31:
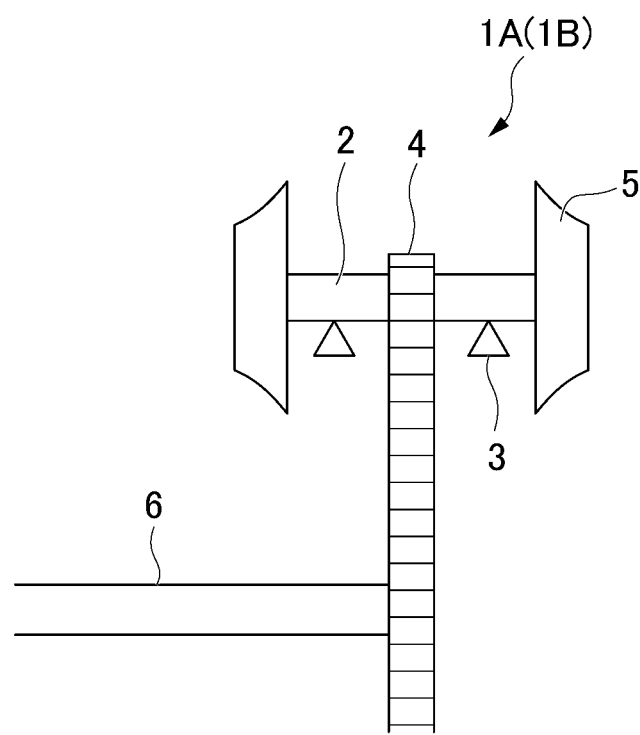
FIG. 31 is a schematic view showing one of rotary machines (geared compressors) to which the squeeze film damper bearing according to the embodiment of the present invention is applied.

FIG. 31 is a schematic view showing a geared compressor to which the squeeze film damper bearing according to the present embodiment is applied. In the geared compressor, a pair of impellers 5 is housed inside a casing (not shown), and a rotary shaft 2 having impellers 5 at both ends is supported by the squeeze film damper bearings 3 in a rotatable manner. At this time, when the power of a drive shaft 6 rotated by a driving source (not shown) is transmitted to the rotary shaft 2 via the gear 4, the rotary shaft 2 rotates to perform a function as a compressor.

The rotary shaft 2 shown in FIG. 1 is disposed such that a central axis O extends in a horizontal direction and is supported by the squeeze film damper bearing 3. Hereinafter, a direction in which the central axis O extends is referred to as an axial direction, and a direction orthogonal to the axial direction is referred to as a radial direction.

The squeeze film damper bearing 3 is equipped with a bearing portion 10 that supports the rotary shaft 2, and a squeeze film damper 20 that dampens the vibration of the bearing portion 10. As shown in FIG. 2, the bearing portion 10 is equipped with a plurality of bearing pads 11 which are divided into a plurality parts in the circumferential direction of the rotary shaft 2, have a circular arc-shaped or sector-shaped cross-section in the radial direction and have a predetermined width in the axial direction, and a pivot 13 which is installed to correspond to each bearing pad 11 and supports each bearing pad 11 from the outside in the radial direction. An inner circumferential face of the bearing pad 11 forms a bearing face 12, and the bearing face 12 supports the rotary shaft 2. The pivot 13 supports the bearing pad 11 from the outside in the radial direction. When a viscous oil is supplied between the rotary shaft 2 and the bearing unit 10 from an oil supply line (not shown), direct metal contact between the rotary shaft 2 and the bearing unit 10 is prevented such that the rotary shaft 2 can smoothly rotate.

The squeeze film damper 20 has an inner support ring 24 that supports the pivot 13 from the outside in the radial direction, an outer support ring 28 that is installed to cover the outer circumferential face of the inner support ring 24 and forms a damper gap 30 between the outer circumferential face of the inner support ring 24 and the outer support ring 28, and an oil film 38 is formed by introducing viscous oil into the damper gap 30.

The inner support ring 24 is a cylindrical member having a circular cross-section in the radial direction and having a predetermined width in the axial direction. The inner support ring 24 is configured to support the pivot 13 on the inner circumferential face from the outside in the radial direction and to be movable in the radial direction.

The outer support ring 28 is a cylindrical member having an annular cross-section in the radial direction and having a predetermined width in the axial direction. The outer support ring 28 is disposed at a predetermined interval radially outside the inner support ring 24, and a damper gap 30 is formed between the outer support ring 28 and the outer circumferential face of the inner support ring 24. The damper gap 30 is a cylindrical space having an annular cross-section in the radial direction and having a width in the axial direction.

The oil film 38 is formed by introducing viscous oil into the damper gap 30, and the radial thickness thereof changes due to the radial displacement of the inner support ring 24. Specifically, in a region in which a radial load is applied from the rotating rotary shaft 2 and the inner support ring 24 is displaced radially outward, the thickness of the oil film 38 decreases, and conversely, in a region in which the inner support ring 24, which is point-symmetrical from the region around the central axis O, is displaced radially inward, the thickness of the oil film 38 increases.

Next, the outer support ring 28 according to the first embodiment of the present invention will be described in detail. As shown in FIGS. 1 to 4, holes 100 forming a dissipation portion for dissipating vibration energy are formed on the inner circumferential face of the outer support ring 28 in the axial direction and the circumferential direction. A plurality of holes 100 are disposed in the axial direction and the circumferential direction at predetermined intervals. In an example, the holes 100 are formed at regular intervals in the axial direction and the circumferential direction as shown in FIG. 4. Further, the holes 100 are formed in a circular shape when viewed from the radial direction by machining, and has a predetermined depth in the radial direction. The dimension, shape, number, arrangement, arrangement interval, and the like of the holes 100 are not particularly limited. As an example, as shown in FIG. 5, the holes 100 may be formed in a square shape when viewed from a radial direction according to a machining method.

Next, the operation of the squeeze film damper bearing 3 according to the present embodiment will be described. In a state in which the oil film 38 is formed in the damper gap 30, for example, when the bearing portion 10 and the inner support ring 24 for supporting the same vibrate with the rotation of the rotary shaft 2, the interval between the damper gaps 30 changes according to the vibration. Due to the change in interval, the oil which forms the oil film 38 moves in the axial direction or the circumferential direction, and a pressure is generated by a so-called squeezing action caused by the viscous resistance of the oil accompanying the movement, thereby obtaining an effect of damping vibration.

Furthermore, according to the squeeze film damper bearing 3 according to the present embodiment, if the bearing portion 10 and the inner support ring 24 for supporting the same vibrate with the rotation of the rotary shaft 2, when the oil moves in the axial direction or the circumferential direction, as shown in FIG. 3, oil enters the hole 100 and a vortex is generated. The vortex is generated when oil flows clockwise or counterclockwise along the inner circumferential face of the hole 100. Further, vibration energy is dissipated by the occurrence of viscous dissipation due to the vortex.

Also, according to the squeeze film damper bearing 3 of the present embodiment, in addition to the conventional squeeze effect, since the vibration energy is dissipated by the occurrence of viscous dissipation inside the hole 100, the damping effect can be improved.

In addition, even when the damping effect due to the squeeze effect decreases because the damper gap 30 of the rotary machine 1A is widened, by imparting the damping effect due to viscous dissipation, it is possible to suppress the decrease in the damping effect, and to secure the stability of the rotary shaft system.

Further, the damping effect can be adjusted by adjusting the dimension, shape, number, arrangement, arrangement interval, and the like of the holes 100.

As described above, the first embodiment of the present invention has been described with reference to the drawings. However, the hole 100 does not necessarily need to be formed on the inner circumferential face of the outer support ring 28, and may be formed on the outer circumferential face of the inner support ring 24. Further, the holes 100 may be formed on both the inner circumferential face of the outer support ring 28 and the outer circumferential face of the inner support ring 24.

Second Embodiment

Figure 6:
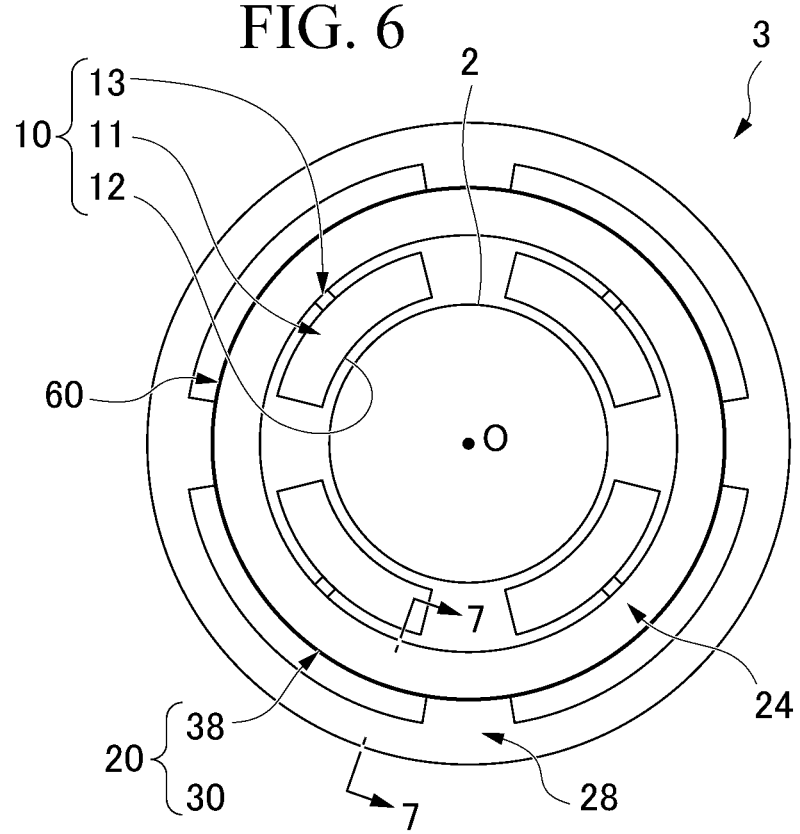
FIG. 6 is an axial cross-sectional view showing a rotary machine according to a second embodiment of the present invention.
Figure 7:
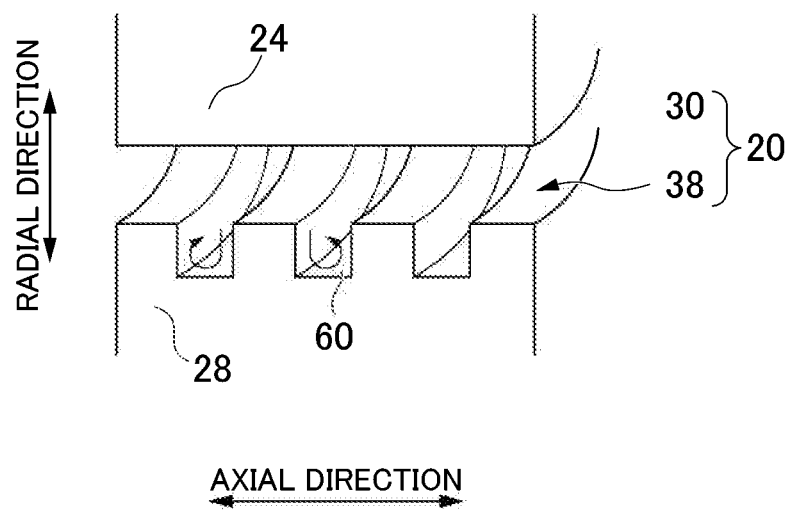
FIG. 7 is a cross-sectional view showing a squeeze film damper bearing according to the second embodiment of the present invention, and is a cross-sectional view taken along a line—7-7—of FIG. 6.
Figure 8:
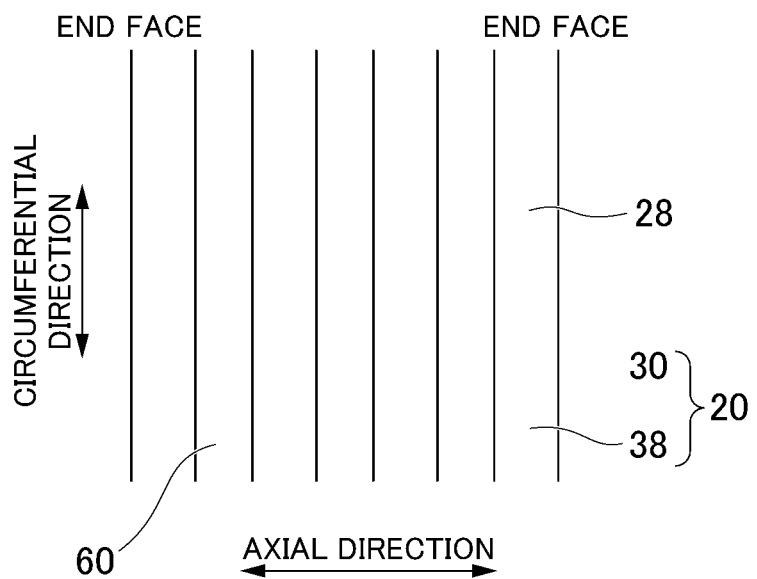
FIG. 8 is a schematic view showing the inner circumferential face of the outer support ring according to the second embodiment of the present invention.

Next, a second embodiment of the present invention will be described with reference to FIGS. 6 to 8. FIG. 6 is an axial cross-sectional view showing the rotary machine according to the present embodiment. FIG. 7 is a cross-sectional view showing the squeeze film damper bearing according to the present embodiment, and is a cross-sectional view taken along a line—7-7—of FIG. 6. FIG. 8 is a schematic view showing the inner circumferential face of the outer support ring according to the present embodiment. The same components as those in the first embodiment are denoted by the same reference numerals, and detailed description thereof will not be provided. The present embodiment differs from the first embodiment in that a circumferential groove 60 which forms a dissipation portion is formed on the inner circumferential face of the outer support ring 28 which forms the damper gap 30, in the axial direction and the circumferential direction. A plurality of circumferential grooves 60 are disposed at predetermined intervals in the axial direction and the circumferential direction. In an example, as shown in FIGS. 6 and 8, the plurality of circumferential grooves 60 are formed at regular intervals in the circumferential direction and the axial direction. Further, the circumferential grooves 60 are formed in a rectangular shape as viewed from the radial direction by machining, and have a predetermined depth in the radial direction. The dimension, shape, number, arrangement, arrangement interval, and the like of the circumferential grooves 60 are not particularly limited.

Next, the operation of the squeeze film damper bearing 3 according to the present embodiment will be described. If the bearing portion 10 and the inner support ring 24 that supports the bearing portion 10 vibrate with the rotation of the rotary shaft 2, when the oil moves in the axial direction or the circumferential direction, as shown in FIG. 7, oil enters the circumferential groove 60 and vortex is generated. The vortex is generated along the inner circumferential face of the circumferential groove 60 when oil flows clockwise or counterclockwise. Vibration energy is dissipated by the occurrence of viscous dissipation due to the vortex.

According to the squeeze film damper bearing 3 of the present embodiment, in addition to the conventional squeeze effect, since the vibration energy is dissipated by the occurrence of viscous dissipation inside the circumferential groove 60, the damping effect can be improved.

Further, even when the damping effect due to the squeeze effect decreases due to the widening of the damper gap 30 of the rotary machine 1A, by imparting the damping effect due to viscous dissipation, it is possible to suppress the decrease in the damping effect, and to secure the stability of the rotary shaft system.

Also, the damping effect can be adjusted by adjusting the dimension, shape, number, arrangement, arrangement interval, and the like of the circumferential grooves 60.

The second embodiment of the present invention has been described as described above. However, the circumferential groove 60 is not necessarily formed on the inner circumferential face of the outer support ring 28 but may be formed on the outer circumferential face of the inner support ring 24. Further, the circumferential groove 60 may be formed on both the inner circumferential face of the outer support ring 28 and the outer circumferential face of the inner support ring 24.

Third Embodiment

Figure 9:
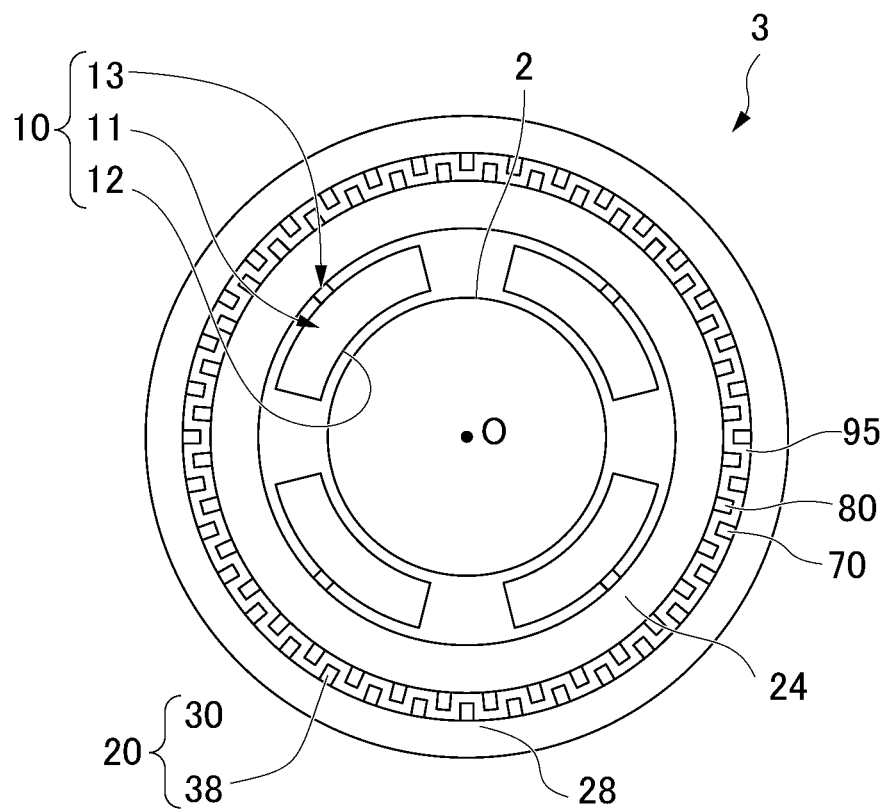
FIG. 9 is an axial cross-sectional view showing a rotary machine according to a third embodiment of the present invention.
Figure 10:
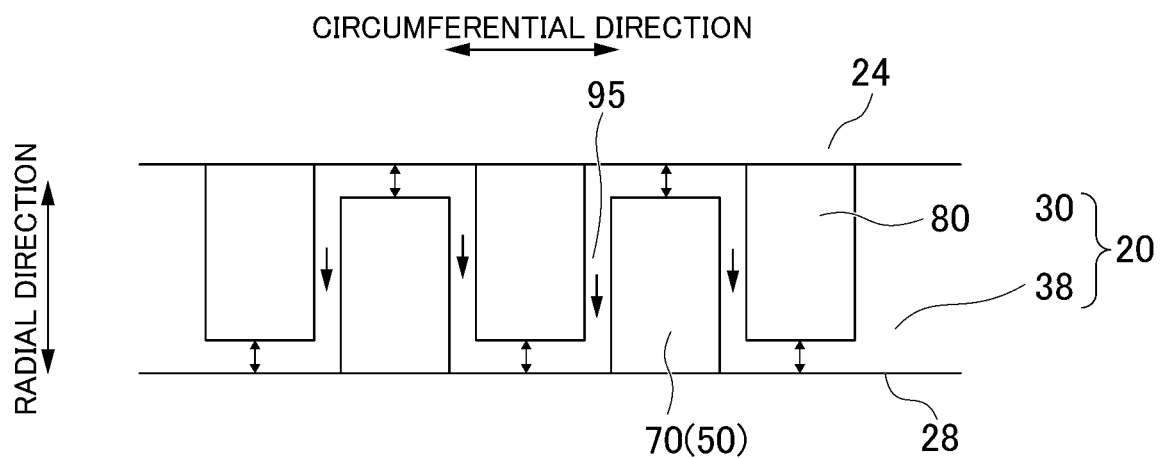
FIG. 10 is an enlarged view of a main part of a damper gap according to the third embodiment of the present invention.
Figure 11:
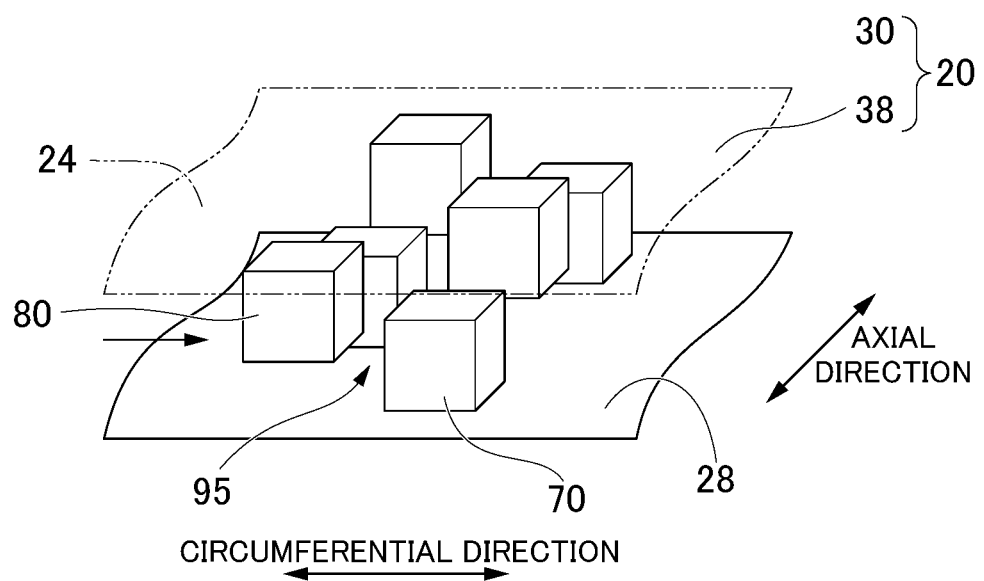
FIG. 11 is a schematic view showing a part of the inner circumferential face of the outer support ring according to the third embodiment of the present invention.

A third embodiment of the present invention will be described with reference to FIGS. 9 to 11. FIG. 9 is an axial cross-sectional view showing the rotary machine according to the present embodiment. FIG. 10 is an enlarged view of a main part of a damper gap according to the present embodiment. FIG. 11 is a schematic view showing a part of the inner circumferential face of the outer support ring according to the present embodiment. The same components as those in the aforementioned embodiments are denoted by the same reference numerals, and detailed description will not be provided. The present embodiment differs from the respective aforementioned embodiments in that a first protrusion 70 which forms a dissipation portion is formed on the inner circumferential face of the outer support ring 28, and a second protrusion 80 which forms the dissipation portion together with the first protrusion 70 is formed on the outer circumferential face of the inner support ring 24.

As shown in FIGS. 9 and 10, a plurality of first protrusions 70 and second protrusions 80 are aligned in the circumferential direction. In an example, the first protrusions 70 are disposed on the inner circumferential face of the outer support ring 28 at regular intervals, and the second protrusions 80 are disposed on the outer circumferential face of the inner support ring 24 at regular intervals. Further, as shown in FIG. 11, the plurality of first protrusions 70 are disposed at different positions in the axial direction on the inner circumferential face of the outer support ring, and the plurality of second protrusions 80 are disposed at different positions in the axial direction on the outer circumferential face of the inner support ring. Further, in an example, the first protrusions 70 and the second protrusions 80 are alternately disposed in the circumferential direction and the axial direction. At this time, a gap 95 is formed between the first protrusion 70 and the second protrusion 80 that are adjacent in the circumferential direction and the axial direction, and the oil can flow through the gap 95. The first protrusions 70 and the second protrusions 80 are not necessarily disposed alternately in the circumferential direction and the axial direction, but may be disposed alternately in a predetermined direction. At this time, the gap 95 is formed in a predetermined direction.

The first protrusion 70 is a protrusion protruding radially inward from the inner circumferential face of the outer support ring 28, and the second protrusion 80 is a protrusion protruding radially outward from the outer circumferential face of the inner support ring 24. As shown in FIG. 11, the first protrusion 70 is, for example, a hexahedron, and the second protrusion 80 is, for example, a hexahedron like the first protrusion.

The dimension, shape, number, arrangement, arrangement interval, and the like of the first protrusion 70 and the second protrusion 80 are not particularly limited.

According to the configuration of the present embodiment, the first protrusion 70 formed on the inner circumferential face of the outer support ring 28 and the second protrusion 80 formed on the outer circumferential face of the inner support ring 24 are alternately disposed to form the gap 95. Further, when the bearing portion 10 and the inner support ring 24 that supports the same vibrate with the rotation of the rotary shaft 2, and the oil moves through the damper gap 30, since the oil flows through the gap 95 as shown in FIG. 10, resistance occurs and vibration energy is dissipated.

Also, according to the squeeze film damper bearing 3 of the present embodiment, in addition to the damping effect of the conventional squeeze effect, since the dissipation of the vibration energy generated between the oil and the outer support ring 28 or the inner support ring 24 increases, the damping effect can be improved.

Further, when the first protrusion 70 and the second protrusion 80 are formed using the laminate shaping, it is possible to finely adjust the dimension, shape, and the like of the first protrusion 70 and the second protrusion 80, compared to a case of using other machining methods. Thus, for example, the gap 95 can be efficiently formed by narrowing the arrangement interval between the first protrusion 70 and the second protrusion 80, and since the dissipation of vibration energy due to resistance increases, the damping effect can be further improved.

In addition, the damping performance can be adjusted by adjusting the dimension, shape, number, arrangement, arrangement interval, and the like of the first protrusion 70 or the second protrusion 80.

The third embodiment of the present invention has been described above. However, the first protrusion 70 and the second protrusion 80 may not have the same dimension, shape, and the like, and the gap 95 may be formed between the first protrusion 70 and the second protrusion 80 that are adjacent in a predetermined direction. Also, the plurality of first protrusions 70 may have configurations different from each other, and the plurality of second protrusions 80 may have configurations different from each other.

Fourth Embodiment

Figure 12:
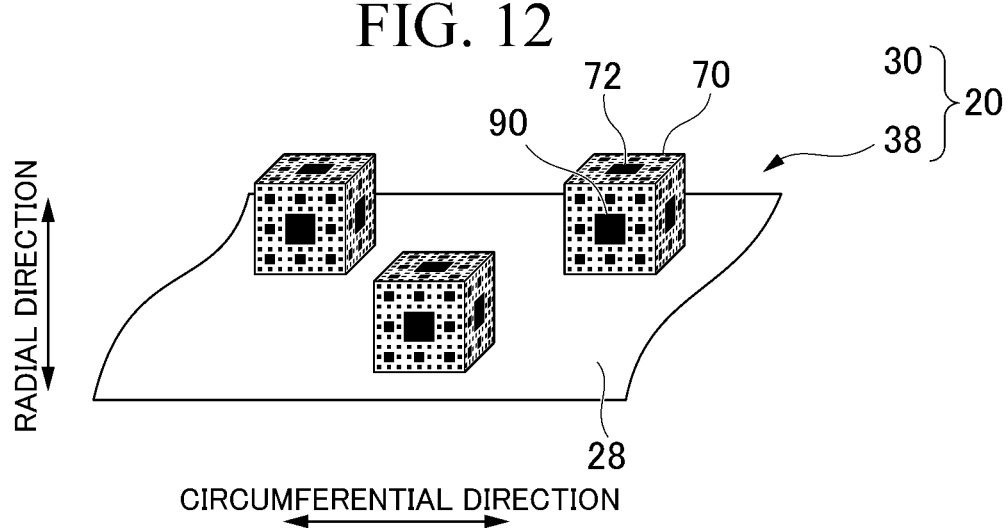
FIG. 12 is a schematic view showing a part of the inner circumferential face of the outer support ring according to a fourth embodiment of the present invention.
Figure 13:
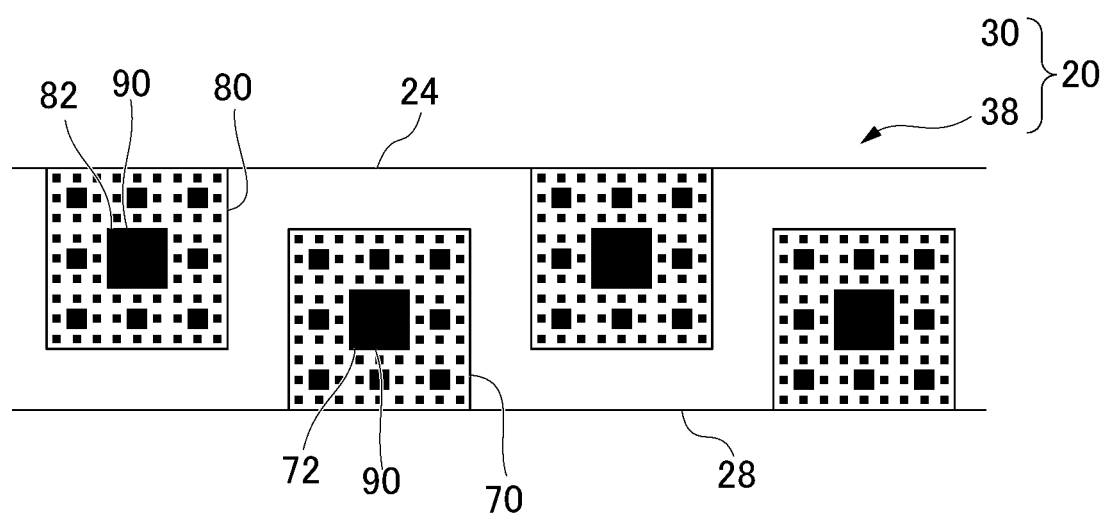
FIG. 13 is an enlarged view of a main part of a damper gap according to the fourth embodiment of the present invention.

A fourth embodiment of the present invention will be described with reference to FIGS. 12 and 13. FIG. 12 is a schematic view showing a part of the inner circumferential face of the outer support ring according to the present embodiment. FIG. 13 is an enlarged view of a main part of a damper gap according to the present embodiment. The same components as those in the aforementioned embodiments are denoted by the same reference numerals, and detailed description thereof will not be provided. The present embodiment differs from the third embodiment in that the first protrusion 70 forming the dissipation portion is provided with a first protrusion flow path 72, and the second protrusion 80 forming the dissipation portion together with the first protrusion 70 is provided with a second protrusion flow path 82. In an example, the first protrusion 70 and the second protrusion 80 are a kind of self-similar fractal figure, in which a penetration hole 90 is formed in a cube. That is, a flow path is provided inside the cube by providing the penetration hole 90 having a shape similar to the shape of each surface on each surface of the protrusion. As described above, when a complicated flow path is formed in the first protrusion 70 and the second protrusion 80, the first protrusion 70 and the second protrusion 80 are desirably formed by laminate shaping as in the case of the third embodiment. Further, the dimension, shape, arrangement, and the like of the first protrusion flow path 72 or the second protrusion flow path 82 are not particularly limited.

According to the configuration of the present embodiment, when the bearing portion 10 and the inner support ring 24 that supports the bearing portion 10 vibrate with the rotation of the rotary shaft 2, the oil flows around the first protrusion 70 or the second protrusion 80, and flows through the first protrusion flow path 72 formed in the first protrusion 70 and the second protrusion flow path 82 formed in the second protrusion 80. At this time, resistance occurs between the oil and the first protrusion flow path 72 and between the oil and the second protrusion flow path 82, and dissipation of vibration energy occurs.

Also, according to the squeeze film damper bearing 3 of the present embodiment, in addition to the damping effect of the conventional squeeze effect, since the dissipation of vibration energy generated between the oil and the first protrusion 70 or the oil and the second protrusion 80 increases, the damping effect can be improved.

Further, when the first protrusion 70 or the second protrusion 80 is formed using the laminate shaping, it is possible to finely adjust the dimension and the like of the first protrusion flow path 72 or the second protrusion flow path 82, as compared to a case of using other machining methods. Thus, the first protrusion flow path 72 and the second protrusion flow path 82 can be formed more finely, and since the dissipation of vibration energy due to resistance increases, it is possible to further improve the damping effect.

Furthermore, the damping performance can be adjusted by adjusting the dimension, shape, arrangement, etc. of the first protrusion flow path 72 or the second protrusion flow path 82.

The fourth embodiment of the present invention has been described above. However, the first protrusion flow path 72 and the second protrusion flow path 82 may not have the same dimension, shape, arrangement, and the like.

Fifth Embodiment

Figure 14:
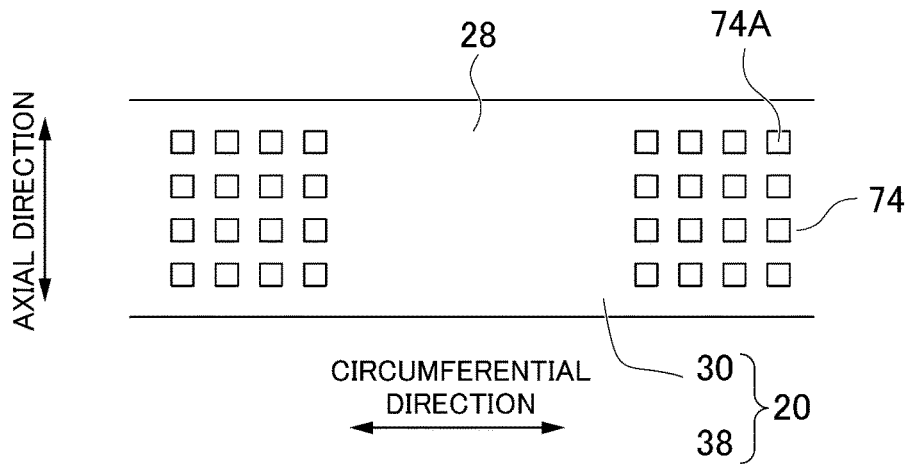
FIG. 14 is a schematic view showing a part of the inner circumferential face of the outer support ring according to a fifth embodiment of the present invention.
Figure 15:
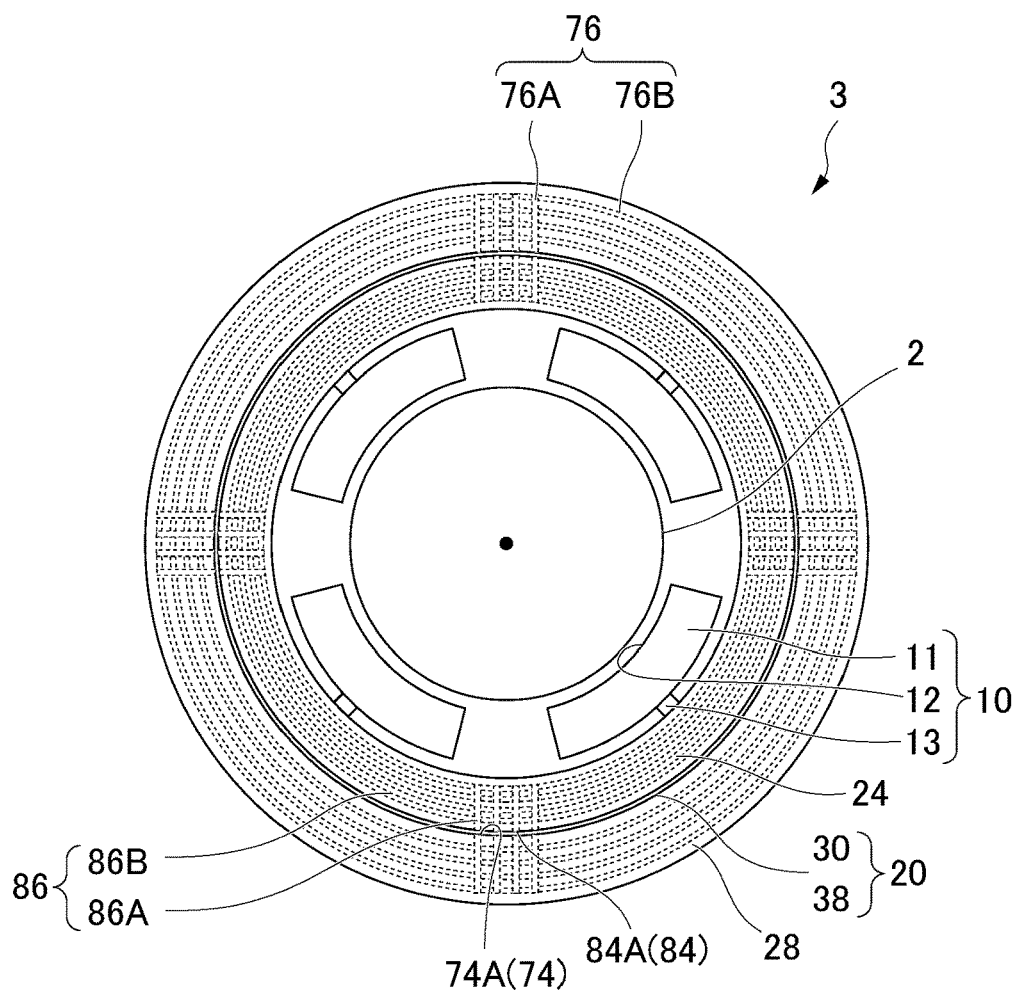
FIG. 15 is an axial cross-sectional view showing a rotary machine according to the fifth embodiment of the present invention.

A fifth embodiment of the present invention will be described with reference to FIGS. 14 and 15. FIG. 14 is a schematic view showing a part of the inner circumferential face of the outer support ring according to the present embodiment. FIG. 15 is an axial cross-sectional view showing the rotary machine according to the present embodiment. The same components as those in the aforementioned embodiments are denoted by the same reference numerals, and detailed description thereof will not be provided. In the present embodiment, a plurality of first flow portions 74 forming the dissipation portion are formed on the inner circumferential face of the outer support ring 28, and a first flow path 76 forming a dissipation portion together with the first flow portions 74 is formed in the circumferential direction inside the outer support ring 28 in communication with the plurality of first flow portions 74. Further, a plurality of second flow portions 84 forming a dissipation portion are formed on the outer circumferential face of the inner support ring 24, and a second flow path 86 forming a dissipation portion together with the second flow portions 84 is formed in the circumferential direction inside the inner support ring 24 in communication with the plurality of second flow portions 84.

A first flow portion 74 connects the damper gap 30 to the first flow path 76, and the oil flows in and out of the damper gap 30 and the first flow path 76 via the first flow portion 74. In an example, as shown in FIG. 14, the first flow portion 74 is a region in which first flow holes 74A each having a square shape as viewed from the radial direction are disposed in four rows and four columns. Further, the first flow portions 74 are disposed at intervals in the circumferential direction, and in an example, as shown in FIG. 15, four first flow portions 74 are disposed at regular intervals in the circumferential direction of the outer support ring 28.

The first flow path 76 is a flow path which has a first radial flow path 76A and a first circumferential flow path 76B, and through which a viscous fluid flows. The first radial flow path 76A is a flow path communicating with the first flow portion 74 and extends in the radial direction, and is formed to correspond to the first flow portion 74. In an example, when the first flow portion 74 is configured by first flow holes 74A of four rows and four columns, as shown in FIG. 15, a plurality of first radial flow paths 76A are formed to correspond to the respective first flow holes 74A.

The first circumferential flow path 76B is an annular flow path which is formed to communicate with the first radial flow path 76A and continuous in the circumferential direction. In an example, as shown in FIG. 15, four first circumferential flow paths 76B are formed at intervals in the radial direction, and each of the first circumferential flow paths 76B is connected to the overall radial flow paths 76A.

The method of machining the outer support ring 28 equipped with the first flow portion 74 and the first flow path 76 is not particularly limited, but is preferably formed by laminate shaping. The dimension, shape, number, arrangement, arrangement interval, and the like of the first flow portion 74 and the first flow path 76 are not particularly limited.

A second flow portion 84 connects the damper gap 30 and the second flow path 86, and the oil flows in and out of the damper gap 30 and the second flow path 86 via the second flow portion 84. The second flow portion 84 is, for example, a region in which second flow holes 84A having a square shape as viewed from the radial direction is disposed in four rows and four columns, as in the first flow portion 74. Further, the second flow portions 84 are disposed at intervals in the circumferential direction, and four second flow portions 84 are disposed at regular intervals in the circumferential direction of the inner support ring 24 as shown in FIG. 15. Further, the second flow portion 84 may not have the same configuration as the first flow portion 74, and may not be formed at the same position in the circumferential direction or the axial direction.

The second flow path 86 is a flow path which has a second radial flow path 86A and a second circumferential flow path 86B, and through which a viscous fluid flows. The second radial flow path 86A is a flow path that communicates with the second flow portion 84 and extends in the radial direction. In general, the second radial flow path 86A is formed to correspond to the second flow portion 84. For example, when the second flow portion 84 is configured by the second flow holes 84A of four rows and four columns, a plurality of second radial flow paths 86A are formed to correspond to the respective second flow holes 84A.

The second circumferential flow path 86B is an annular flow path which is formed to communicate with the second radial flow path 86A and continuous in the circumferential direction. In an example, as shown in FIG. 15, four second circumferential flow paths 86B are formed at intervals in the radial direction, and each of the second circumferential flow paths 86B is connected to the overall second radial flow paths 86A.

Further, the method of machining the inner support ring 24 equipped with the second flow portion 84 and the second flow path 86 is not particularly limited, but is preferably formed by laminate shaping. The dimension, shape, number, arrangement, arrangement interval, and the like of the second flow portion 84 and the second flow path 86 are not particularly limited.

According to the configuration of the present embodiment, when the bearing portion 10 and the inner support ring 24 that supports the bearing portion 10 vibrate with rotation of the rotary shaft 2, and the oil moves through the damper gap 30, the oil flows through the first radial flow path 76A and the first circumferential flow path 76B via the first flow portion 74, and flows through the second radial flow path 86A and the second circumferential flow path 86B via the second flow portion 84. Further, when the oil flows through the first flow path 76 or the second flow path 86, resistance occurs, and vibration energy is dissipated.

Also, according to the squeeze film damper bearing 3 of the present embodiment, in addition to the damping effect of the conventional squeeze effect, since the dissipation of vibration energy occurs between the oil and the first flow path 76 or the second flow path 86, the damping effect can be improved.

Further, when the outer support ring 28 or the inner support ring 24 is formed using the laminate shaping, the dimension, shape and the like of the first flow path 76 or the second flow path 86 can be finely adjusted as compared to a case of using another machining method. Thus, the first flow path 76 or the second flow path 86 can be formed more finely, and since the dissipation of vibration energy due to resistance increases, the damping effect can be further improved.

The fifth embodiment of the present invention has been described above. However, it is not necessary to provide the first flow portion 74 and the first flow path 76 or the second flow portion 84 and the second flow path 86 in both the outer support ring 28 and the inner support ring 24, and the first flow portion 74 and the first flow path 76 or the second flow portion 84 and the second flow path 86 may be formed in one of the outer support ring 28 and the inner support ring 24. Further, the first flow portion 74 or the second flow portion 84 does not need to be an aggregate in which a plurality of components are gathered as shown in FIG. 14

Sixth Embodiment

Figure 16:
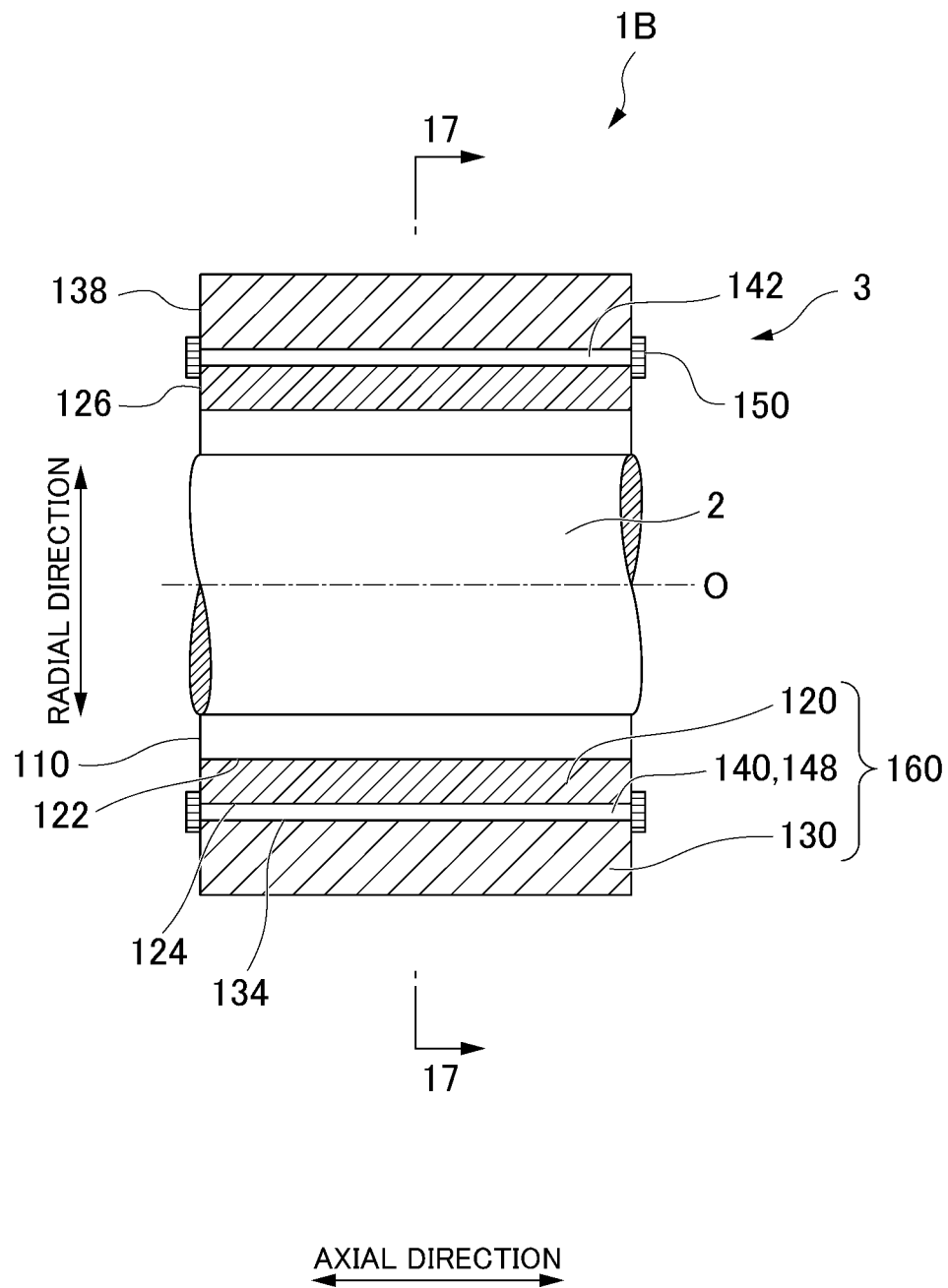
FIG. 16 is a cross-sectional view showing a rotary machine according to a sixth embodiment of the present invention.
Figure 17:
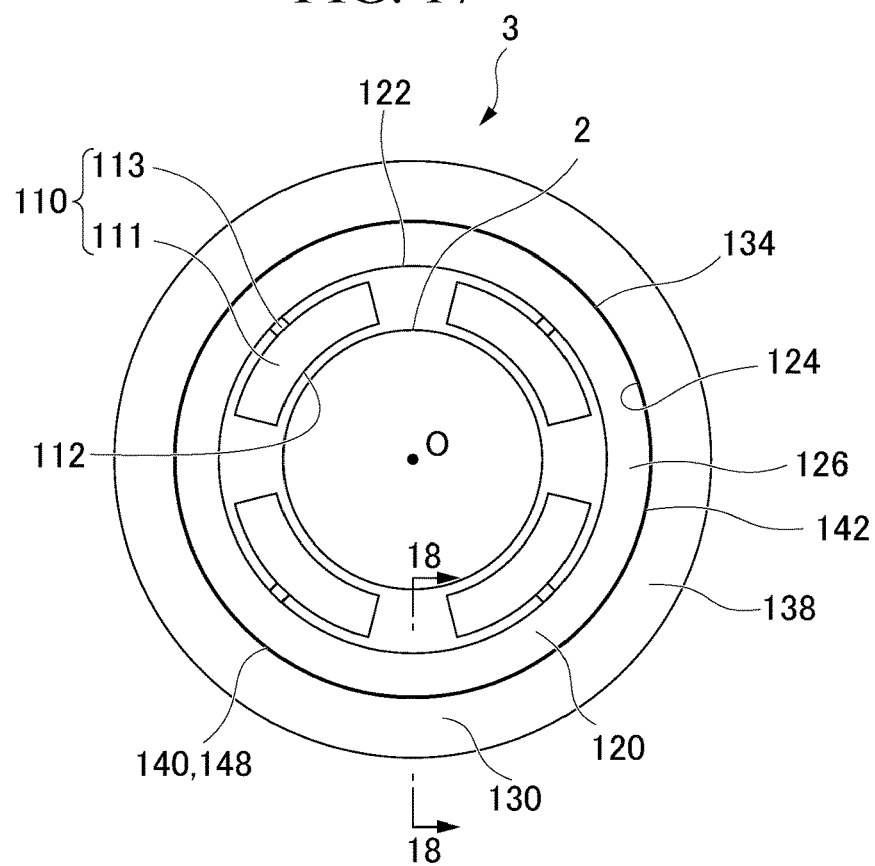
FIG. 17 is an axial cross-sectional view showing the rotary machine according to the sixth embodiment of the present invention, and is a cross-sectional view taken along a line—17-17—of FIG. 16.
Figure 18:
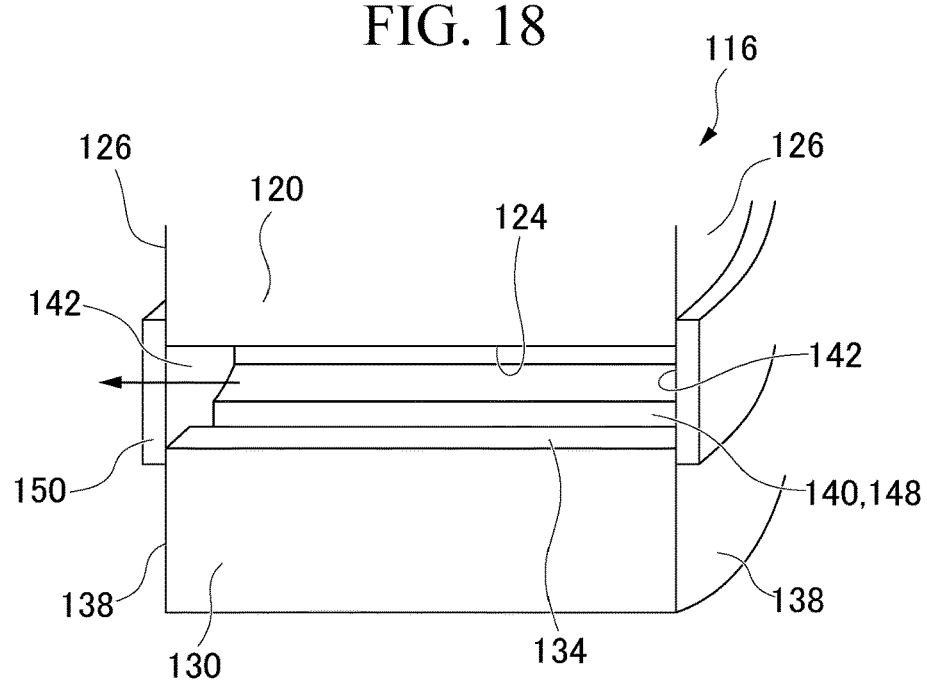
FIG. 18 is a cross-sectional view showing a squeeze film damper bearing according to the sixth embodiment of the present invention, and is a cross-sectional view taken along a line—18-18—of FIG. 17.
Figure 19:
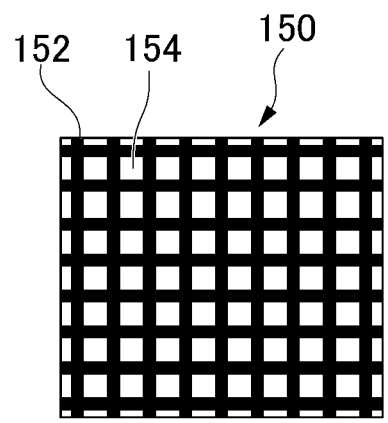
FIG. 19 is a schematic view showing a resistance member according to the sixth embodiment of the present invention.
Figure 20:
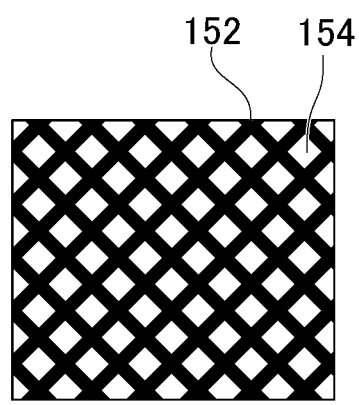
FIG. 20 is a schematic view showing a resistance member according to a modified example of the sixth embodiment of the present invention.
Figure 21:
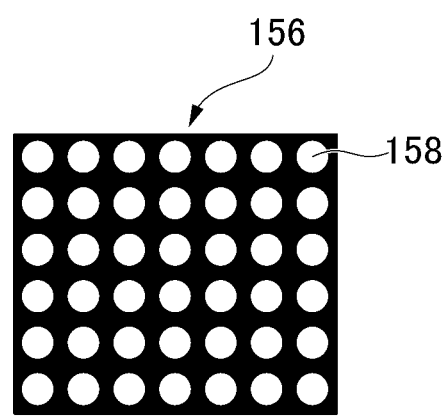
FIG. 21 is a schematic view showing a resistance member according to the modified example of the sixth embodiment of the present invention.

A sixth embodiment of the present invention will be described with reference to FIGS. 16 to 21. FIG. 16 is a cross-sectional view showing the rotary machine according to the present embodiment. As shown in FIG. 16, a rotary machine 1B is equipped with a rotary shaft 2, and a squeeze film damper bearing 3 that supports the rotary shaft 2. The squeeze film damper bearing 3 has a squeeze film damper 116. FIG. 17 is an axial cross-sectional view showing the rotary machine according to the present embodiment, and is a cross-sectional view taken along a line—17-17—of FIG. 16. FIG. 18 is a cross-sectional view showing the squeeze film damper bearing according to the present embodiment, and is a cross-sectional view taken along a line—18-18—of FIG. 17. FIG. 19 is a schematic view showing a resistance member according to the present embodiment. FIGS. 20 and 21 are schematic views showing a resistance member according to a modified example of the present embodiment.

The rotary shaft 2 shown in FIG. 1 is disposed such that the central axis O extends in the horizontal direction and is supported by the squeeze film damper bearing 3. Hereinafter, a direction in which the central axis O extends is referred to as an axial direction, and a direction orthogonal to the axial direction is referred to as a radial direction.

The squeeze film damper bearing 3 is equipped with a bearing portion 110 that supports the rotary shaft 2, and a squeeze film damper 116 that dampens the vibration of the bearing portion 110. As shown in FIG. 2, the bearing portion 110 is equipped with a plurality of bearing pads 111 which are divided into a plurality parts in the circumferential direction of the rotary shaft 2 as shown in FIG. 2, have a circular arc-shaped or sector-shaped cross-section in the radial direction and have a predetermined width in the axial direction, and a pivot 113 which is installed to correspond to the bearing pad 111 and supports each bearing pad 111 from the outside in the radial direction. The inner circumferential face of the bearing pad 111 constitutes a bearing face 112, and the bearing face 112 supports the rotary shaft 2. The pivot 113 supports the bearing pad 111 from the outside in the radial direction. When a viscous oil is supplied between the rotary shaft 2 and the bearing portion 110 from an oil supply line (not shown), a direct metal contact between the rotary shaft 2 and the bearing portion 110 is prevented, such that the rotary shaft 2 can smoothly rotate.

The squeeze film damper 116 is equipped with an inner support ring 120 that supports the pivot 113 from the outside in the radial direction, and an annular outer support ring 130 that is installed to cover the radially outer circumferential face of the inner support ring 120 and forms a damper gap 140 between the outer circumferential face of the inner support ring 120 and the annular outer support ring 130, and an oil film 148 is formed by introducing oil into the damper gap 140.

The inner support ring 120 is a cylindrical member having a radial cross-section of an annular shape and having a predetermined width in the axial direction. The inner support ring 120 is configured to support the pivot 113 from the outside in the radial direction on the internal inner circumferential face 122 and to be movable in the radial direction.

The outer support ring 130 is a cylindrical member having a radial cross-section of an annular shape and having a predetermined width in the axial direction. The outer support ring 130 is disposed radially outward of the inner support ring 120 at a predetermined interval, and a damper gap 140 is formed between an external inner circumferential face 134 of the outer support ring 130 and an internal outer circumferential face 124 of the inner support ring 120. The damper gap 140 is a cylindrical space having a radial cross-section of an annular shape and having a width in the axial direction.

The oil film 148 is formed by introducing viscous oil into the damper gap 140, and the radial thickness changes due to the radial displacement of the inner support ring 120. Specifically, the thickness of the oil film 148 decreases in a region in which a radial load is applied from the rotating rotary shaft 2 and the inner support ring 120 is displaced radially outward, and conversely, and the thickness of the oil film 148 increases in a region in which the inner support ring 120, which is point-symmetrical from the region around the central axis O, is displaced radially inward.

Next, the squeeze film damper 116 according to the sixth embodiment of the present invention will be described in detail. As shown in FIGS. 16 to 18, a resistance member is installed on a damper end face 142 which is an end part of the damper gap 140 in the axial direction to cover the damper gap 140. The resistance member is an annular member that is installed on both damper end faces 142 in the axial direction and covers the damper gap 140 in the circumferential direction.

The resistance member is, for example, a wire mesh 150 as shown in FIG. 19. The wire mesh 150 is formed by stacking a plurality of metal wire materials 152 in a mesh and welding intersections of the plurality of wire materials 152 so that the mesh 154 forms a square shape or a rectangular shape. Further, one end of the wire mesh 150 in the radial direction is attached to an inner end face 126 that is an axial end face of the inner support ring 120, and the other end thereof is attached to an outer end face 138 that is an axial end face of the outer support ring 130. Further, the wire mesh 150 is configured to be able to expand and contract with the vibration of the inner support ring 120. The roughness, shape, dimension, and the like of the wire mesh 150 are not particularly limited. In addition, for convenience of description, the wire mesh 150 is omitted in FIG. 17.

Next, the operation of the squeeze film damper bearing 3 according to the present embodiment will be described. In a state in which the oil film 148 is formed in the damper gap 140, when the bearing portion 110 and the inner support ring 120 that supports the same vibrate, for example, with the rotation of the rotary shaft 2, the interval between the damper gaps 140 changes according to the vibration. Due to the change in the interval, the oil in the oil film 148 formed in the damper gap 140 flows in the axial direction or the circumferential direction, and a pressure is generated by a so-called squeeze effect caused by the viscous resistance of the oil accompanying the flow, and above-mentioned damping effect against the vibration is obtained.

Further, according to the squeeze film damper bearing 3 of the present embodiment, the wire mesh 150 is disposed on the damper end face 142. Thus, when the bearing portion 110 and the inner support ring 120 that supports the bearing portion 110 vibrate with the rotation of the rotary shaft 2, the oil of the oil film 148 flows in the axial direction and passes through the wire mesh 150 attached to the damper end face 142. Further, when the oil passes through the wire mesh 150, since the wire mesh 150 acts as a resistance to the flow of the oil, the vibration energy is dissipated.

Therefore, according to the squeeze film damper bearing 3 of the present embodiment, in addition to the conventional squeeze effect, since the oil discharged from the damper gap 140 functions as a damper for the vibration of the inner support ring 120, it is possible to improve the damping effect.

Further, even when the damping effect due to the squeeze effect decreases because the damper gap 140 of the rotary machine 1B is widened, it is possible to suppress the decrease in the damping effect and secure the stability of the rotary shaft system, by the damping effect imparted by the wire mesh 150. Further, by adjusting the roughness, shape, dimension, and the like of the wire mesh 150, the damping effect can be adjusted.

The sixth embodiment of the present invention has been described above while referring to the drawings. However, the wire mesh 150 can also form the shape of the mesh 154 in a diamond shape as shown in FIG. 20. Further, as a shape for giving resistance to oil, it is also possible to form as shown in FIG. 21. In the case of FIG. 21, a circular hole 158 is formed on the surface of a metal plate 156.

Seventh Embodiment

Figure 22:
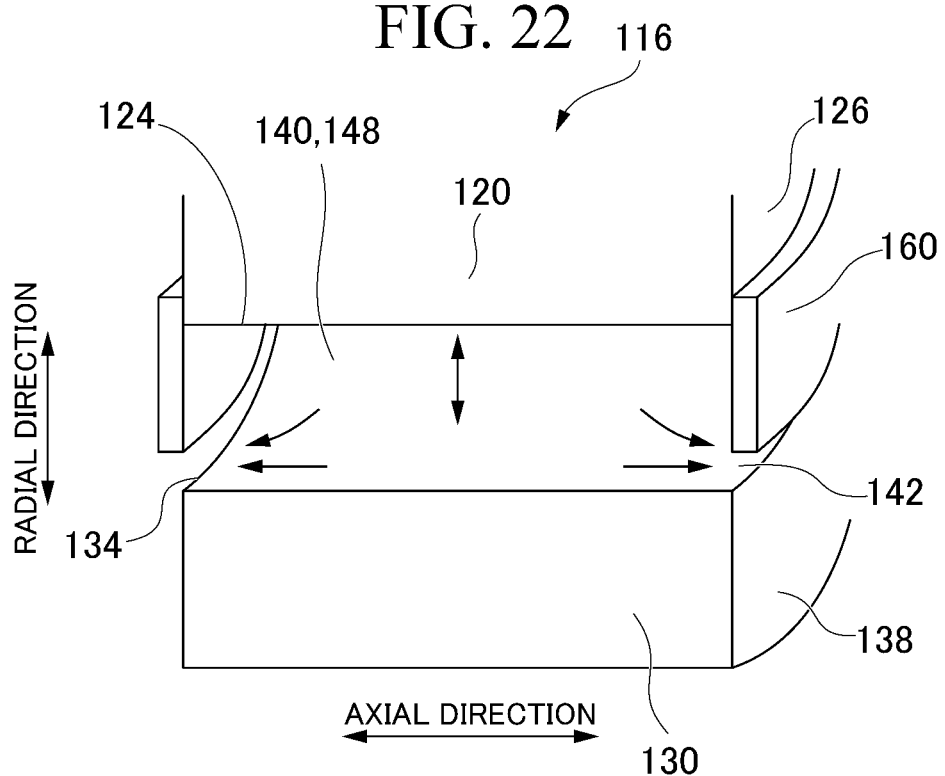
FIG. 22 is a cross-sectional view showing a squeeze film damper bearing according to a seventh embodiment of the present invention.
Figure 23:
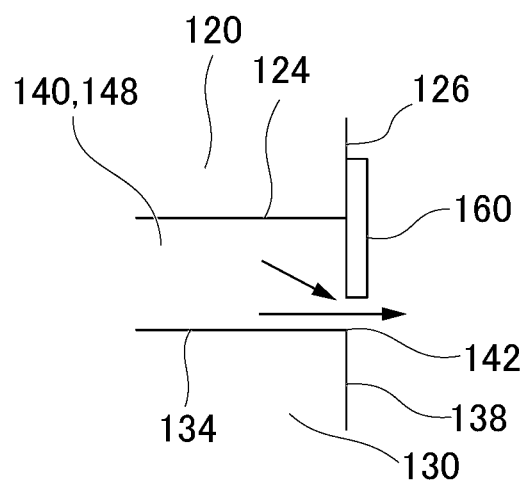
FIG. 23 is an enlarged view of a main part showing a damper gap according to the seventh embodiment of the present invention.
Figure 24:
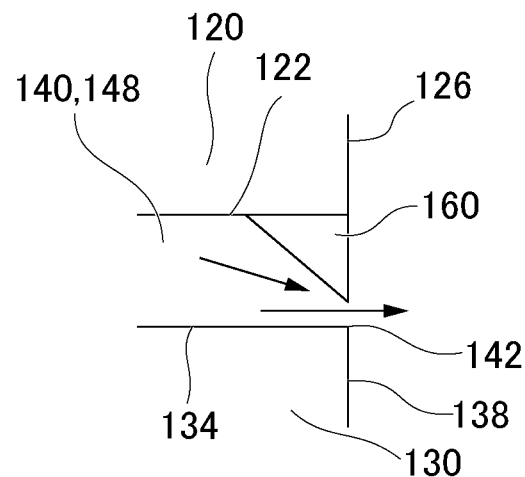
FIG. 24 is an enlarged view of a main part showing a damper gap according to a modified example of the seventh embodiment of the present invention.

Next, a seventh embodiment of the present invention will be described with reference to FIGS. 22 to 24. FIG. 22 is a cross-sectional view showing a squeeze film damper bearing according to the present embodiment. FIG. 23 is an enlarged view of a main part showing a damper gap according to the present embodiment. FIG. 24 is an enlarged view of a main part showing a damper gap according to a modified example of the present embodiment. The same components as those in the sixth embodiment are denoted by the same reference numerals, and detailed description thereof will be omitted. The present embodiment is different from the sixth embodiment in that end face components 160 installed on both damper end face 142 partially cover the damper gap 140 in the radial direction. The end face components 160 are annular members which have one end attached to the inner end face 126, are protruded in the radial direction, and are formed so as to extend in the circumferential direction. Further, the end face components 160 are installed on the damper end face 142, and are provided to be movable in the radial direction with the vibration of the inner support ring 120. The shape, dimension, and the like of the end face components 160 are not particularly limited as long as they are members that partially cover the damper gap 140. Further, the end face components 160 are formed by machining without any particular limitation.

According to the aforementioned configuration, when the bearing portion 110 and the inner support ring 120 that supports the bearing portion 110 vibrate with the rotation of the rotary shaft 2, the oil of the oil film 148 formed in the damper gap 140 flows in the axial direction or the circumferential direction. Further, some of the oil passes through the end face component 160 installed on the damper end face 142 and is discharged from the damper gap 140. At this time, as shown in FIG. 23, since the flow of the oil is throttled by the end face component 160, the end face component 160 acts as a resistance when the oil passes through the end face of the damper part, and thus, the vibration energy is dissipated. Accordingly, since the oil discharged from the damper gap 140 functions as a damper for the vibration of the inner support ring 120, the damping effect can be improved.

Further, even when the damping effect due to the squeeze effect decreases because the damper gap 140 of the rotary machine 1B is widened, since the oil flow can be narrowed by the end face component 160, the damping effect is obtained, and it is possible to suppress the reduction in the damping effect and to secure the stability of the rotary shaft system. Further, the damping effect can be adjusted by adjusting the dimension, shape, and the like of the end face component 160. Further, since the end face component 160 can provide the damping effect to the squeeze film damper bearing 3 with a simple configuration, it has an advantage that the workability of the component is excellent.

The seventh embodiment of the present invention has been described above. However, the end face component 160 does not necessarily need to be attached to the inner end face 126, and may be attached to the outer end face 138. Further, the end face component 160 may be formed, for example, as shown in FIG. 24. In the case of FIG. 24, the end face component 160 is installed on the internal outer circumferential face 124. At this time, the interval of the damper gap 140 becomes narrower toward the end part in the axial direction, and the flow of oil can be narrowed.

Eighth Embodiment

Figure 25:
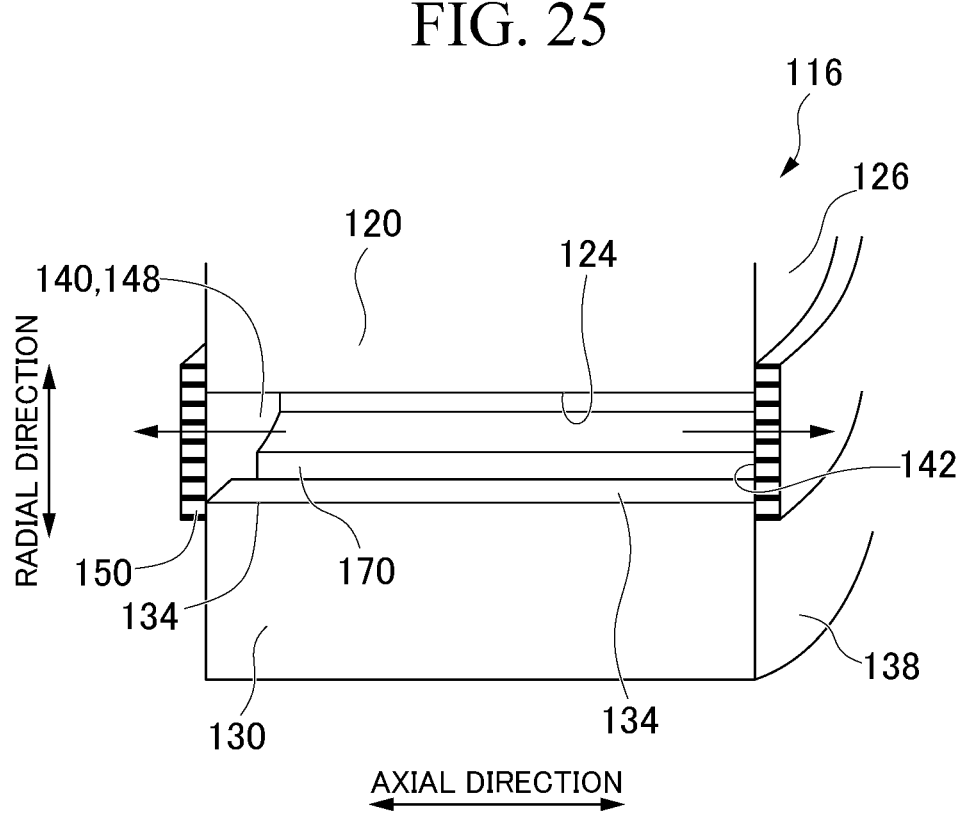
FIG. 25 is a cross-sectional view showing a squeeze film damper bearing according to an eighth embodiment of the present invention.
Figure 26:
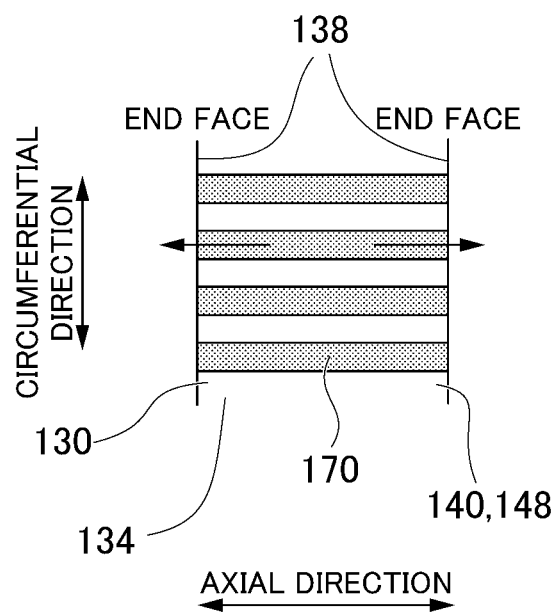
FIG. 26 is a schematic view showing a part of the inner circumferential face of the outer support ring according to the eighth embodiment of the present invention.
Figure 27A:
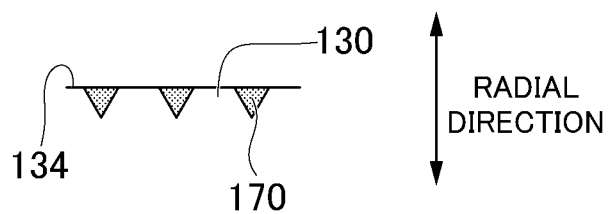
FIG. 27A is a diagram showing a shape (a triangular shape) of an axial groove according to a modified example of the eighth embodiment of the present invention.
Figure 27B:
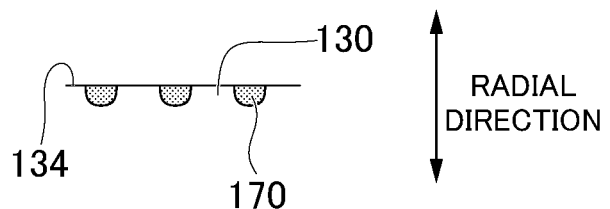
FIG. 27B is a diagram showing a shape (a round shape) of the axial groove according to the modified example of the eighth embodiment of the present invention.
Figure 28:
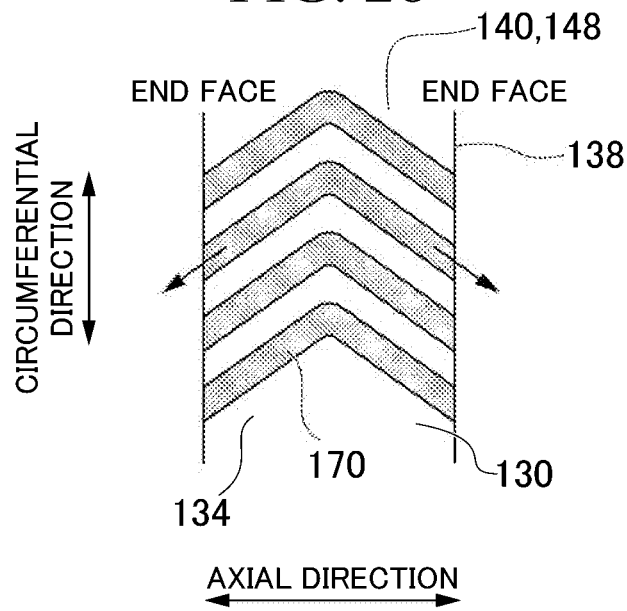
FIG. 28 is a schematic view showing a part of the inner circumferential face of an outer support ring according to the modified example of the eighth embodiment of the present invention.

An eighth embodiment of the present invention will be described with reference to FIGS. 25 to 28. FIG. 25 is a cross-sectional view showing the squeeze film damper bearing according to the present embodiment. FIG. 26 is a schematic view showing a part of the inner circumferential face of the outer support ring according to the present embodiment. FIGS. 27A and 27B are diagrams showing the shape of an axial groove according to a modified example of the present embodiment. FIG. 28 is a schematic view showing a part of the inner circumferential face of the outer support ring according to a modified example of the present embodiment. The same components as those in the aforementioned embodiments are denoted by the same reference numerals, and detailed description thereof will not be provided. As shown in FIG. 25, this embodiment is different from the aforementioned embodiments in that an axial groove 170 is formed on the external inner circumferential face 134.

As shown in FIG. 26, the axial groove 170 is a groove extending in the axial direction which extends in a direction toward the end face, and has a rectangular cross-section. Further, a plurality of axial grooves 170 are formed in the circumferential direction. In an example, the plurality of axial grooves 170 can be disposed at regular intervals in the circumferential direction. Further, the axial grooves 170 are formed by machining, and the dimension, shape, arrangement, arrangement interval, and the like thereof are not particularly limited.

According to the aforementioned configuration, when the bearing portion 110 and the inner support ring 120 that supports the bearing portion 110 vibrate with the rotation of the rotary shaft 2, since the oil flowing through the damper gap 140 flows into the axial groove 170, and flows in the direction in which the axial groove 170 extends, a rectifying effect is obtained. Therefore, when the oil flowing in the axial direction passes through a resistance member such as the wire mesh 150 or the end face component 160 installed on the damper end face 142, since the vibration energy is dissipated, the damping effect can be improved. Further, by adjusting the dimension, shape, arrangement, arrangement interval, and the like of the axial grooves 170, the above-described rectifying effect can be adjusted.

The eighth embodiment of the present invention has been described above. However, the cross-sectional shape of the axial groove 170 is not limited to a rectangular shape, and may be formed in a triangular shape as in FIG. 27A or a circular shape as in FIG. 27B. In addition, the axial groove 170 does not need to be formed parallel to the axial direction, and may be formed so that oil flows to the damper end face 142. In an example, the axial groove 170 may be formed in a V-shape as viewed from the radial direction as shown in FIG. 28.

Ninth Embodiment

Figure 29:
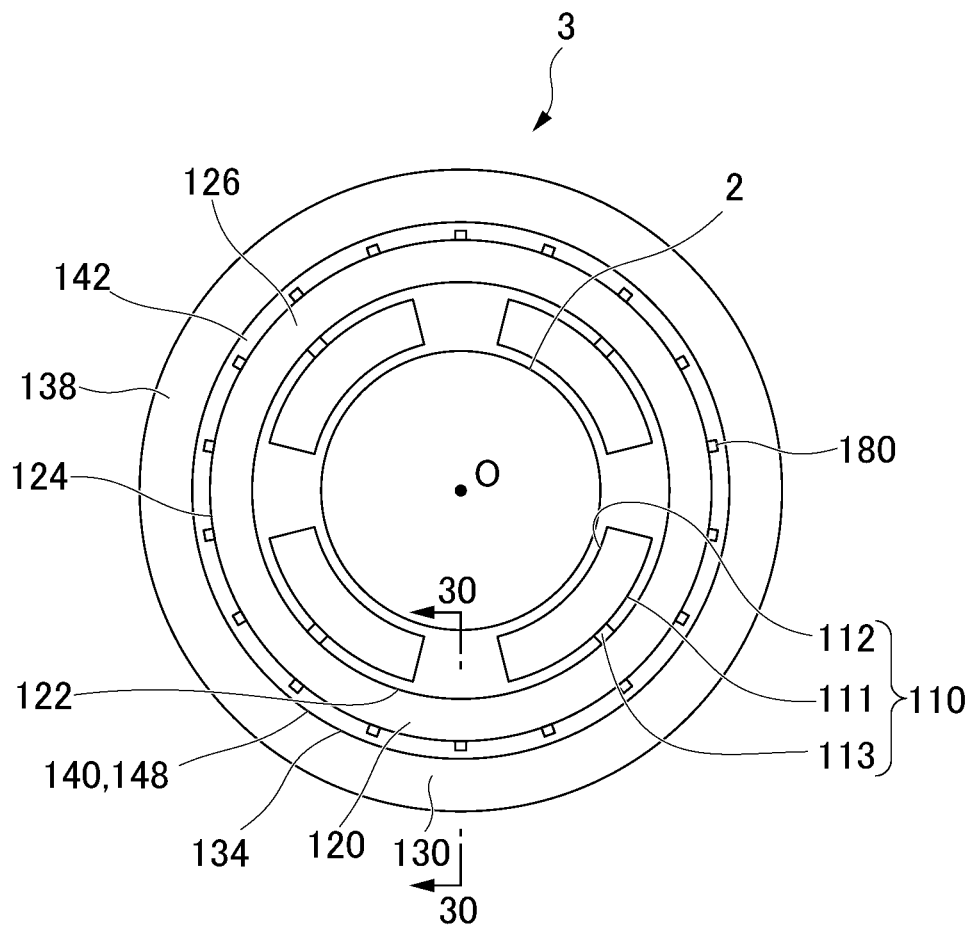
FIG. 29 is an axial cross-sectional view showing a rotary machine according to a ninth embodiment of the present invention.
Figure 30:
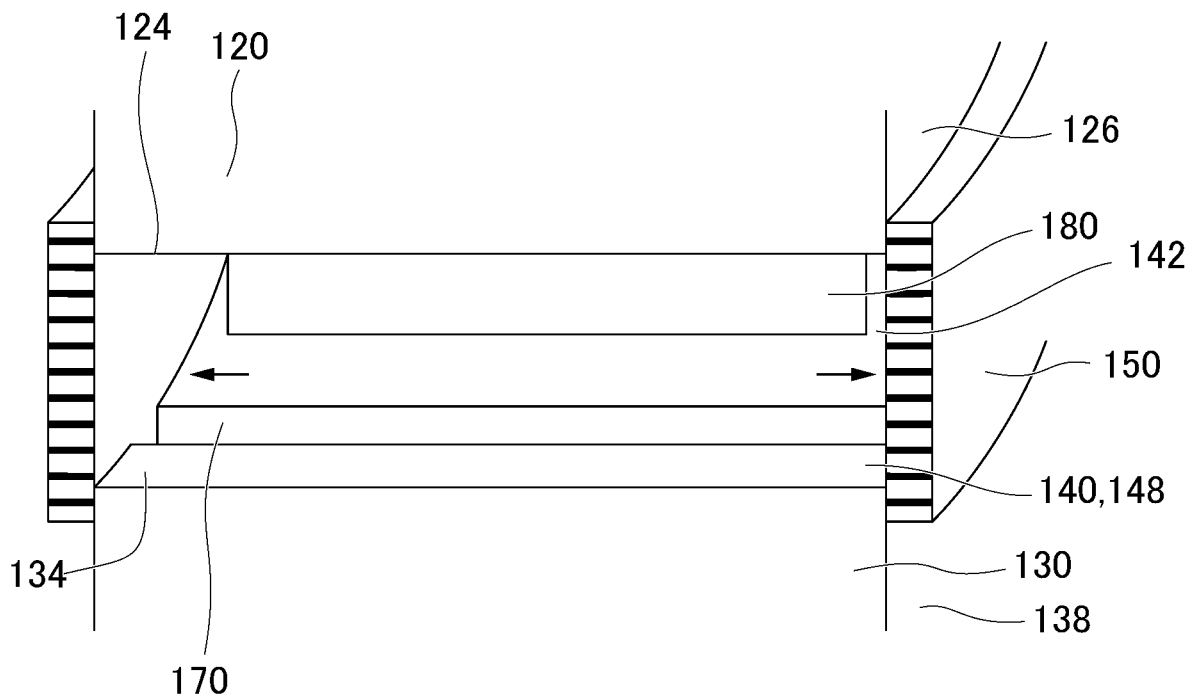
FIG. 30 is a cross-sectional view showing the squeeze film damper bearing according to the ninth embodiment of the present invention, and is a cross-sectional view taken along a line—30-30—of FIG. 29.

A ninth embodiment of the present invention will be described with reference to FIGS. 29 and 30. FIG. 29 is an axial cross-sectional view showing the rotary machine according to the present embodiment. FIG. 30 is a cross-sectional view showing the squeeze film damper bearing according to the present embodiment, and is a cross-sectional view taken along a line—30-30—of FIG. 29. The same components as those in the aforementioned embodiments are denoted by the same reference numerals, and a detailed description thereof will not be provided. This embodiment is different from the eighth embodiment in that a partition plate 180 is installed on the internal outer circumferential face 124. The partition plate 180 is a plate-like member which extends from the internal outer circumferential face 124 to the external inner circumferential face 134 and has a predetermined width in the axial direction.

Further, a plurality of partition plates 180 are provided in the circumferential direction. In an example, the plurality of partition plates 180 are installed at regular intervals in the circumferential direction. Further, the plurality of partition plates 180 are movable in conjunction with the inner support ring 120. The plurality of partition plates 180 are provided by machining. Further, the dimension, number, arrangement, arrangement interval, and the like of the partition plates 180 are not particularly limited.

According to the aforementioned configuration, when the bearing portion 110 and the inner support ring 120 that supports the bearing portion 110 vibrate with the vibration of the rotary shaft 2, and the oil of the oil film 148 formed in the damper gap 140 flows, the partition plate 180 has the effect of impeding the flow of oil in the circumferential direction and promoting the flow in the axial direction. Therefore, when the oil flowing in the axial direction passes through the resistance member such as the wire mesh 150 or the end face component 160 installed on the damper end face 142, since the vibration energy is dissipated, the damping effect can be improved. Further, the rectifying effect can be adjusted by adjusting the dimension, number, arrangement, arrangement interval, and the like of the partition plates 180.

The embodiments of the present invention have been described above in detail with reference to the drawings. However, the specific configuration is not limited to these embodiments, and includes design changes and the like without departing from the gist of the present invention. For example, the bearings according to the first to ninth embodiments are not necessarily applied to the compressor, but may be applied to a gas turbine, a steam turbine or the like in which a rotary shaft rotates by receiving fluid force from a working fluid on a rotor blade. Also, various bearing systems can be applied to the bearing portion. For example, an annular bearing metal may be used. Further, the inner support ring and the outer support ring may have a split ring structure divided vertically.

EXPLANATION OF REFERENCES 1A, 1B Rotary machine
2 Rotary shaft
3 Squeeze film damper bearing
4 Gear
5 Impeller
6 Drive shaft
10 Bearing portion
11 Bearing pad
12 Bearing face
13 Pivot
20 Squeeze film damper
24 Inner support ring
28 Outer support ring
30 Damper gap
38 Oil film
60 Circumferential groove
70 First protrusion
72 First protrusion flow path
74 First flow portion
74A First flow hole
76 First flow path
76A First radial flow path
76B First circumferential flow path
80 Second protrusion
82 Second protrusion flow path
84 Second flow portion
84A Second flow hole
86 Second flow path
86A Second radial flow path
86B Second circumferential flow path
90 Penetration hole
95 Gap
100 Hole
110 Bearing portion
111 Bearing pad
112 Bearing face
113 Pivot
116 Squeeze film damper
120 Inner support ring
122 Internal inner circumferential face
124 Internal outer circumferential face
126 Inner end face
130 Outer support ring
134 External inner circumferential face
138 Outer end face
140 Damper gap
142 Damper end face
148 Oil film
150 Wire mesh
152 Wire material
154 Mesh
156 Plate
158 Hole
160 End face component
170 Axial groove
180 Partition plate
O Central axis

What is claimed is:

1. A squeeze film damper bearing comprising:
an inner support ring capable of supporting a bearing portion;
an outer support ring disposed on an outer periphery of the inner support ring, wherein the inner support ring is configured to be movable in the radial direction relative to the outer support ring; and
a dissipation portion formed on at least one of the outer support ring and the inner support ring to dissipate vibration energy, wherein
a damper gap formed between an outer circumferential face of the inner support ring and an inner circumferential face of the outer support ring is filled with a viscous fluid, and
when the inner support ring vibrates relative to the outer support ring, the viscous fluid flows into the dissipation portion and the vibration energy is dissipated.

2. The squeeze film damper bearing according to claim 1, wherein
the dissipation portion includes one or more holes formed on at least one of the inner circumferential face of the outer support ring and the outer circumferential face of the inner support ring.

3. The squeeze film damper bearing according to claim 1, wherein
the dissipation portion includes one or more circumferential grooves formed on at least one of the inner circumferential face of the outer support ring and the outer circumferential face of the inner support ring.

4. The squeeze film damper bearing according to claim 1, wherein
the dissipation portion includes:
one or more first protrusions formed on the inner circumferential face of the outer support ring; and one or more second protrusions formed on the outer circumferential face of the inner support ring, wherein the first protrusions and the second protrusions are alternately disposed in a predetermined direction, and gaps are formed between the adjacent first and second protrusions.

5. The squeeze film damper bearing according to claim 4, wherein the dissipation portion includes:
   a first protrusion flow path formed in the first protrusion and through which the viscous fluid flows; and
   a second protrusion flow path formed in the second protrusion and through which the viscous fluid flows.

6. The squeeze film damper bearing according to claim 1, wherein the dissipation portion includes:
   a plurality of first flow portions formed on the inner circumferential face of the outer support ring and through which the viscous fluid flows; and
   a first flow path communicating with the first flow portion aligned in a circumferential direction of the outer support ring, wherein the viscous fluid flows through the first flow path.

7. The squeeze film damper bearing according to claim 6, wherein the dissipation portion further includes:
   a plurality of second flow portions formed on the outer circumferential face of the inner support ring and through which the viscous fluid flows; and
   a second flow path communicating with the second flow portion aligned in the circumferential direction of the inner support ring, wherein the viscous fluid flows through the second flow path.

8. A rotary machine comprising:
the squeeze film damper bearing according to claim 1; and
a rotary shaft supported by the squeeze film damper bearing in a rotatable manner.

9. A squeeze film damper bearing comprising:
an inner support ring capable of supporting a bearing portion;
an outer support ring disposed on an outer periphery of the inner support ring; and
a resistance member installed on an end face of a damper gap formed between an outer circumferential face of the inner support ring and an inner circumferential face of the outer support ring, wherein the damper gap is filled with a viscous fluid, and
wherein the resistance member on the end face of the damper gap is configured to allow the viscous fluid to pass through.

10. The squeeze film damper bearing according to claim 9, wherein the resistance member is formed in a mesh.

11. The squeeze film damper bearing according to claim 9, wherein the end face of the damper gap is partially covered with the resistance member.

12. The squeeze film damper bearing according to claim 9, wherein the outer support ring includes a groove extending in a direction toward the end face.

13. The squeeze film damper bearing according to claim 9, wherein the inner support ring includes a plurality of partition plates formed on the outer circumferential face.

14. A rotary machine comprising:
the squeeze film damper bearing according to claim 9; and
a rotary shaft supported by the squeeze film damper bearing in a rotatable manner.

\* \* \* \* \*